(12) United States Patent
Kim et al.

(10) Patent No.: US 10,735,816 B2
(45) Date of Patent: *Aug. 4, 2020

(54) CONTENT REPRODUCTION METHOD AND DEVICE

(71) Applicant: LG ELECTRONICS INC., Seoul (KR)

(72) Inventors: Soyoung Kim, Seoul (KR); Youngwook Kang, Seoul (KR); Youngjun Jo, Seoul (KR); Soojin Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 409 days.

This patent is subject to a terminal disclaimer.

(21) Appl. No.: 15/515,411

(22) PCT Filed: Jul. 16, 2015

(86) PCT No.: PCT/KR2015/007396
§ 371 (c)(1),
(2) Date: Mar. 29, 2017

(87) PCT Pub. No.: WO2016/052846
PCT Pub. Date: Apr. 7, 2016

(65) Prior Publication Data
US 2017/0230716 A1    Aug. 10, 2017

Related U.S. Application Data

(60) Provisional application No. 62/079,563, filed on Nov. 14, 2014, provisional application No. 62/075,256, (Continued)

(51) Int. Cl.
*H04N 21/47* (2011.01)
*H04N 21/6334* (2011.01)
(Continued)

(52) U.S. Cl.
CPC ............ *H04N 21/47* (2013.01); *H04L 9/32* (2013.01); *H04L 9/3268* (2013.01);
(Continued)

(58) Field of Classification Search
CPC ..... H04L 9/32; H04L 2209/60; H04L 9/3268; H04N 21/258; H04N 21/47;
(Continued)

(56) References Cited

U.S. PATENT DOCUMENTS 6,772,331 B1    8/2004  Hind et al.
9,986,291 B2 *  5/2018  Cho .................. H04N 21/835
(Continued)

FOREIGN PATENT DOCUMENTS

KR    10-2001-0114272 A    12/2001
KR    10-2007-0001785 A     1/2007
(Continued)

*Primary Examiner* — Kim T Nguyen
(74) *Attorney, Agent, or Firm* — Birch, Stewart, Kolasch & Birch, LLP

(57) ABSTRACT

Disclosed herein is a method and apparatus for managing license information for playing secure high definition content. The method includes receiving a certificate revision list (CRL) from a license server, receiving encrypted license information allowing a playback of the content through a first session established between a storage device and the license server wherein the first session is identified by session identification information, and playing the content based on the license information.

10 Claims, 28 Drawing Sheets

Related U.S. Application Data filed on Nov. 5, 2014, provisional application No. 62/058,671, filed on Oct. 2, 2014.

(51) Int. Cl.
| | | |
|---|---|---|
| *H04N 21/472* | (2011.01) | |
| *H04L 9/32* | (2006.01) | |
| *H04N 21/258* | (2011.01) | |
| *H04N 21/4405* | (2011.01) | |
| *G06Q 30/06* | (2012.01) | |

(52) U.S. Cl.
CPC ....... *H04N 21/258* (2013.01); *H04N 21/2585* (2013.01); *H04N 21/25816* (2013.01); *H04N 21/4405* (2013.01); *H04N 21/47202* (2013.01); *H04N 21/47217* (2013.01); *H04N 21/6334* (2013.01); *G06Q 30/0601* (2013.01); *H04L 2209/60* (2013.01)

(58) Field of Classification Search
CPC ......... H04N 21/6334; H04N 21/25816; H04N 21/2585; H04N 21/4405; H04N 21/47202; H04N 21/47217; G06Q 30/0601

See application file for complete search history.

(56) References Cited

U.S. PATENT DOCUMENTS

| | | | |
|---|---|---|---|
| 2007/0005502 A1 | 1/2007 | Ohno et al. | |
| 2008/0289050 A1* | 11/2008 | Kawamoto | G06F 21/10 726/28 |
| 2008/0294894 A1* | 11/2008 | Dubhashi | H04L 9/3271 713/168 |
| 2011/0162075 A1* | 6/2011 | Lin | G06F 21/10 726/26 |
| 2012/0013945 A1* | 1/2012 | Suzuki | H04N 1/32771 358/1.15 |
| 2015/0178478 A1 | 6/2015 | Kocher et al. | |
| 2015/0296268 A1 | 10/2015 | Lee et al. | |

FOREIGN PATENT DOCUMENTS

| | | |
|---|---|---|
| KR | 10-2010-0022953 A | 3/2010 |
| KR | 10-2011-0085156 A | 7/2011 |
| WO | WO 2014/015073 A1 | 1/2014 |
| WO | WO 2014/069949 A1 | 5/2014 |

\* cited by examiner

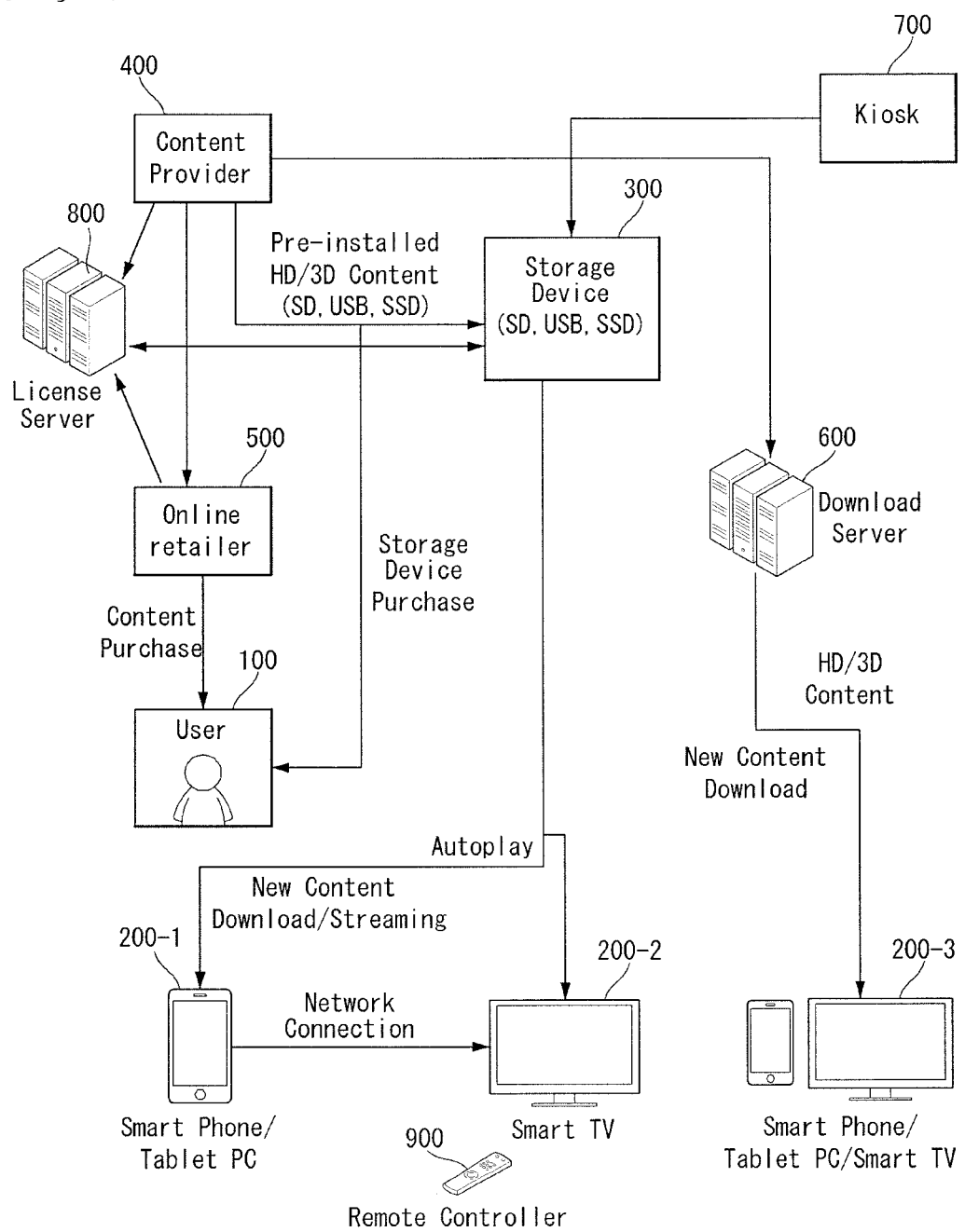
[Fig.1]

[Fig.2]
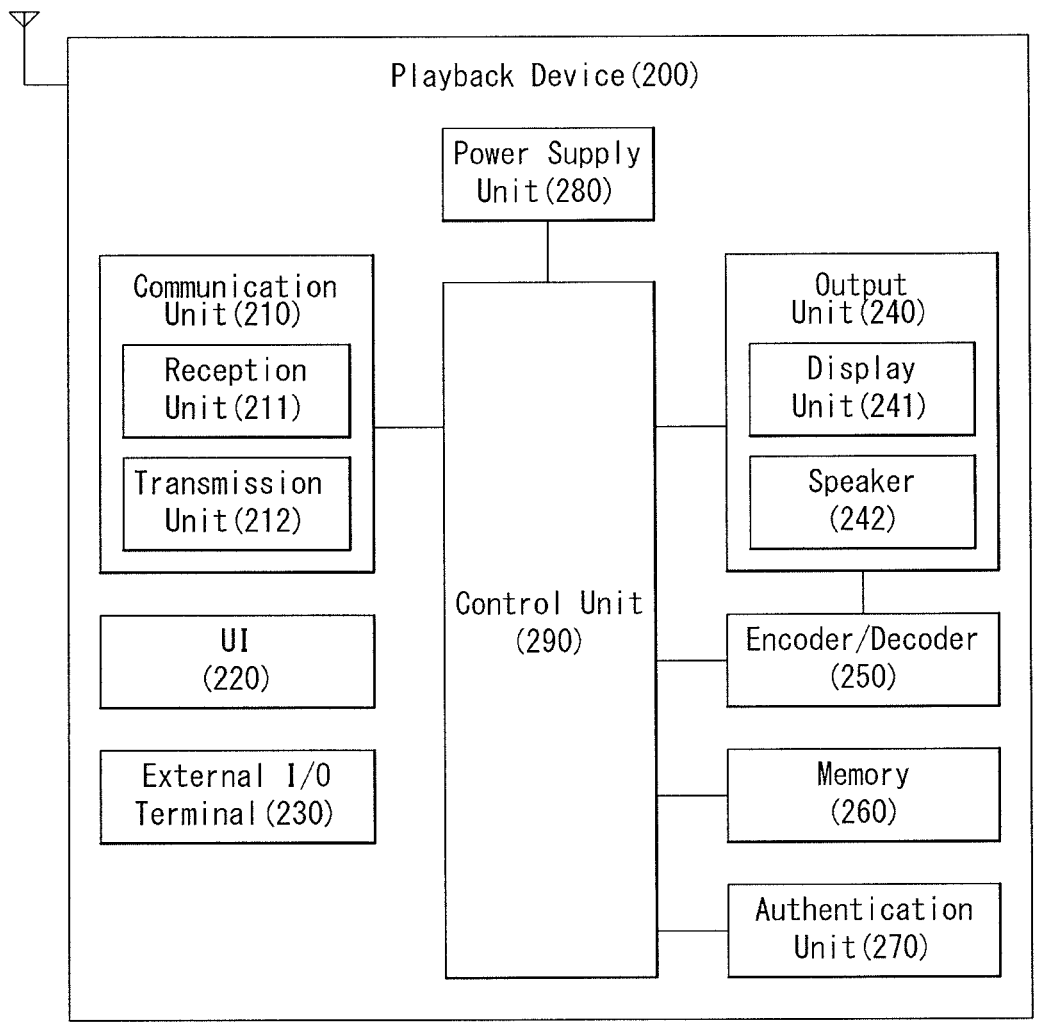

[Fig.3]
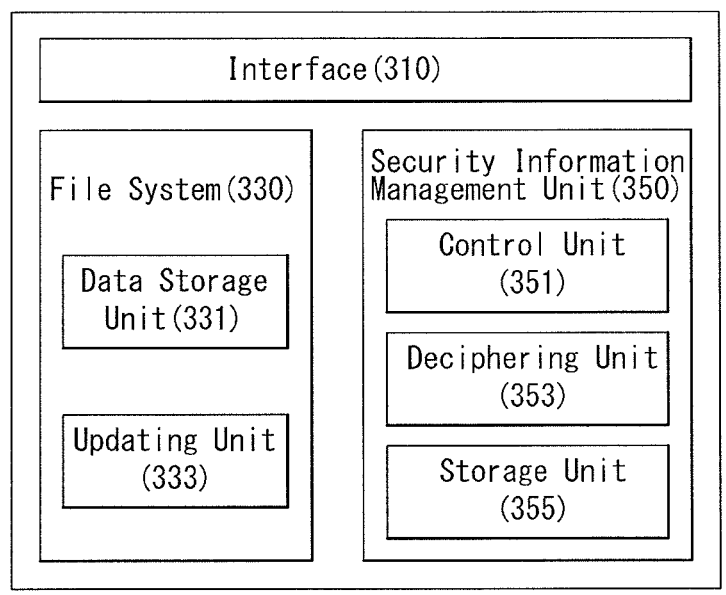

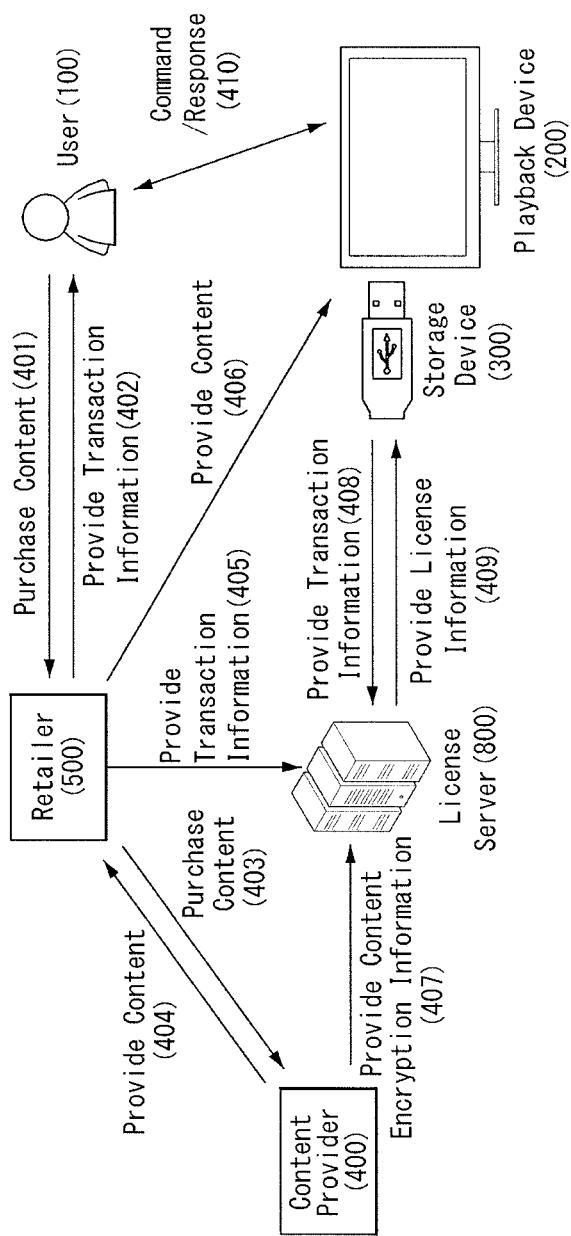
[Fig. 4]

[Fig.5]
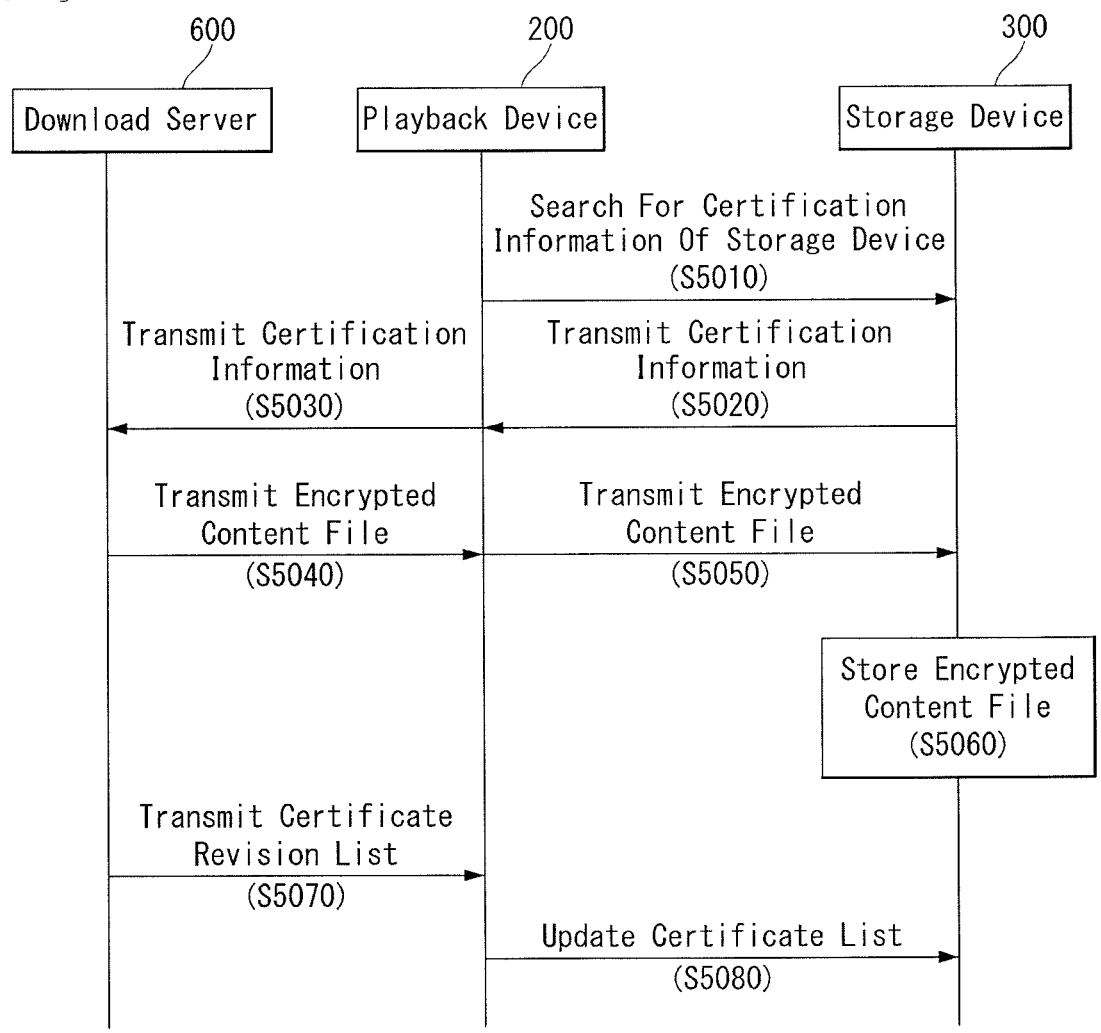

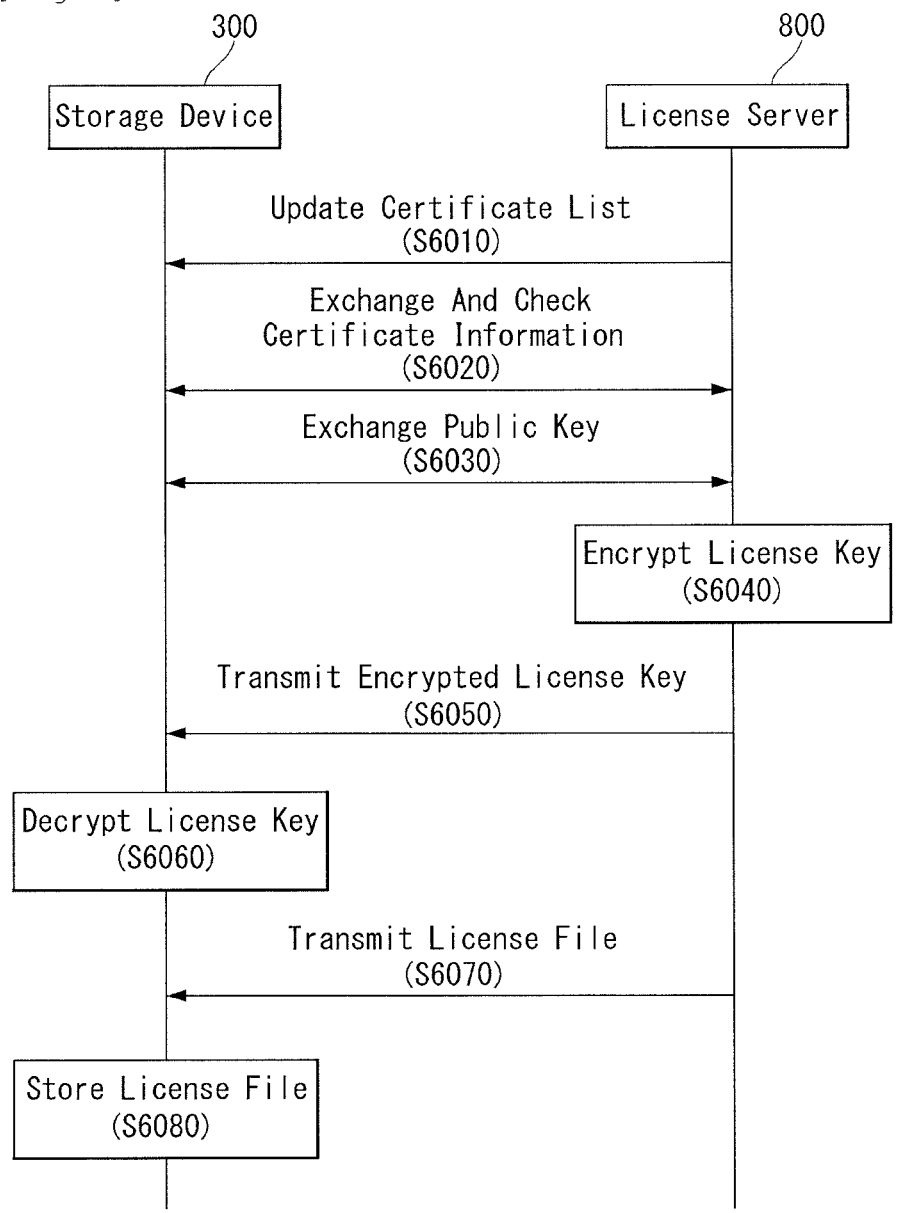

[Fig.7]
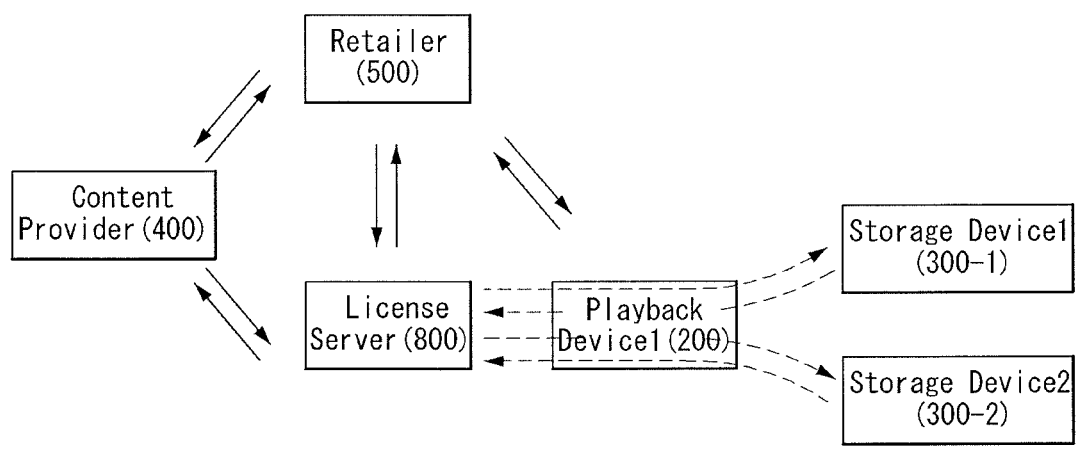

[Fig.8]
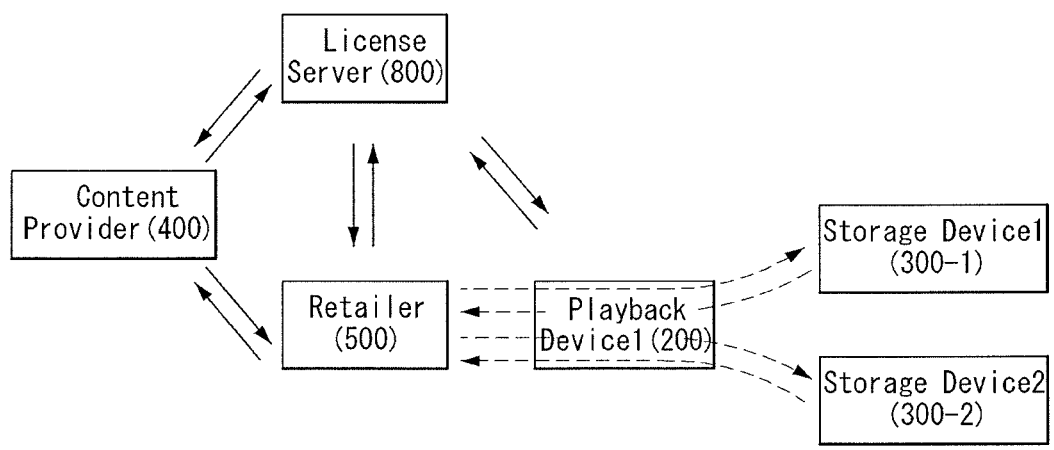

[Fig.9]
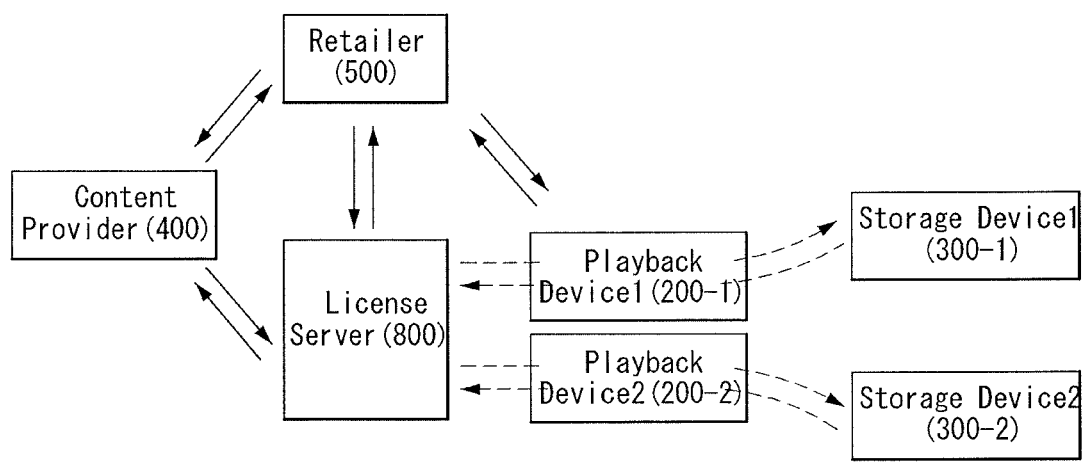

[Fig.10]
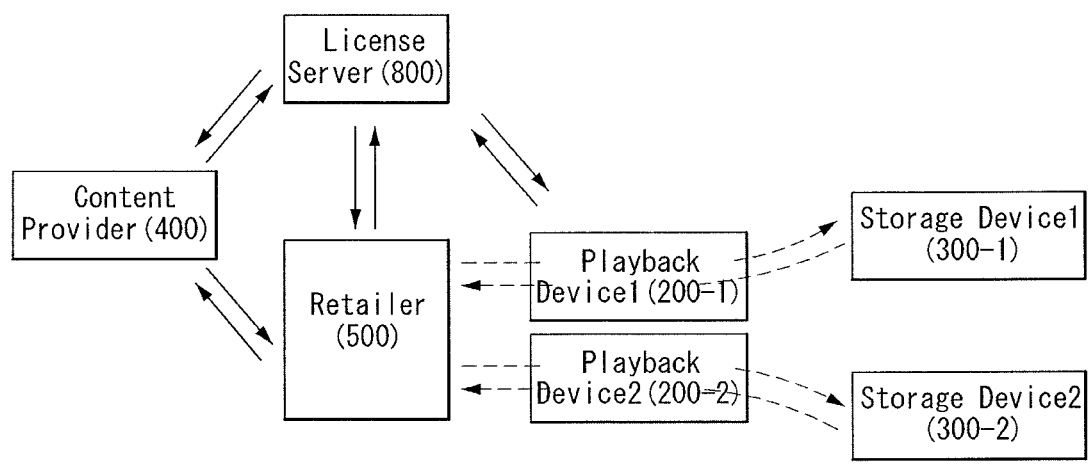

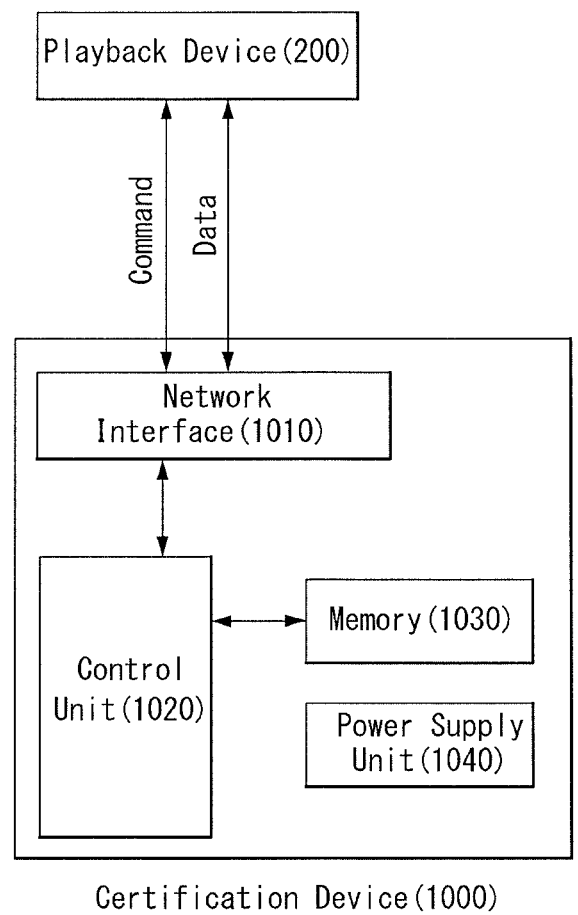

[Fig.12]
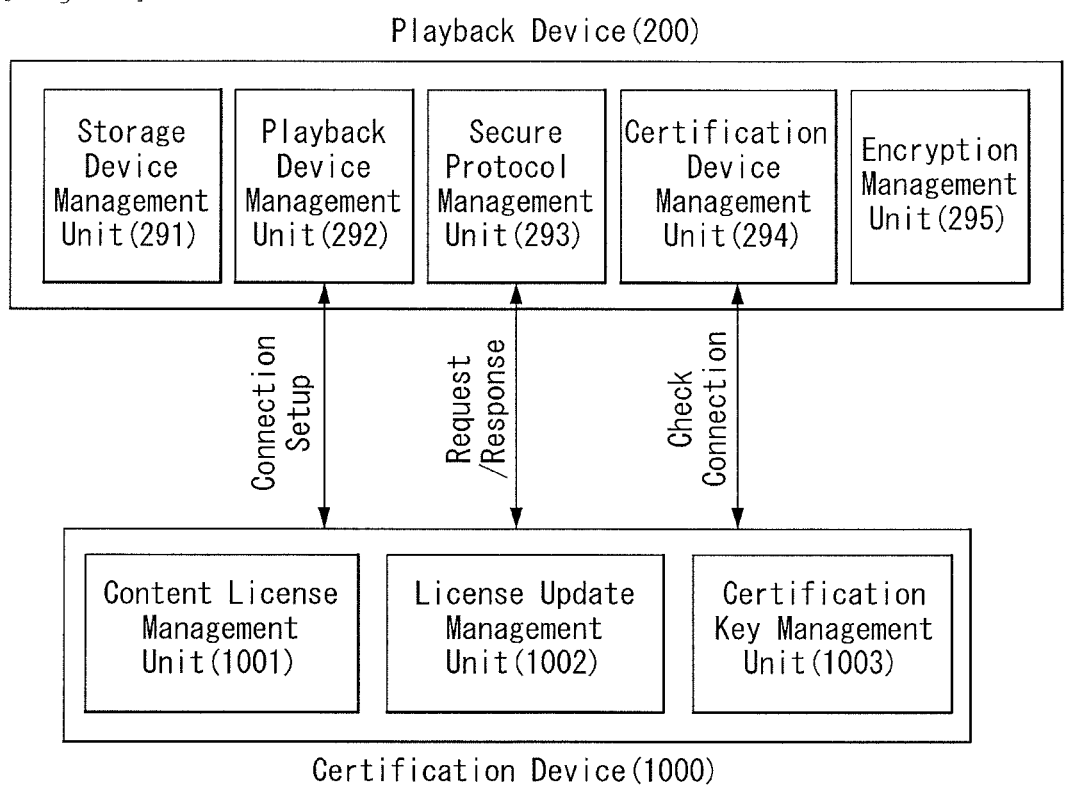

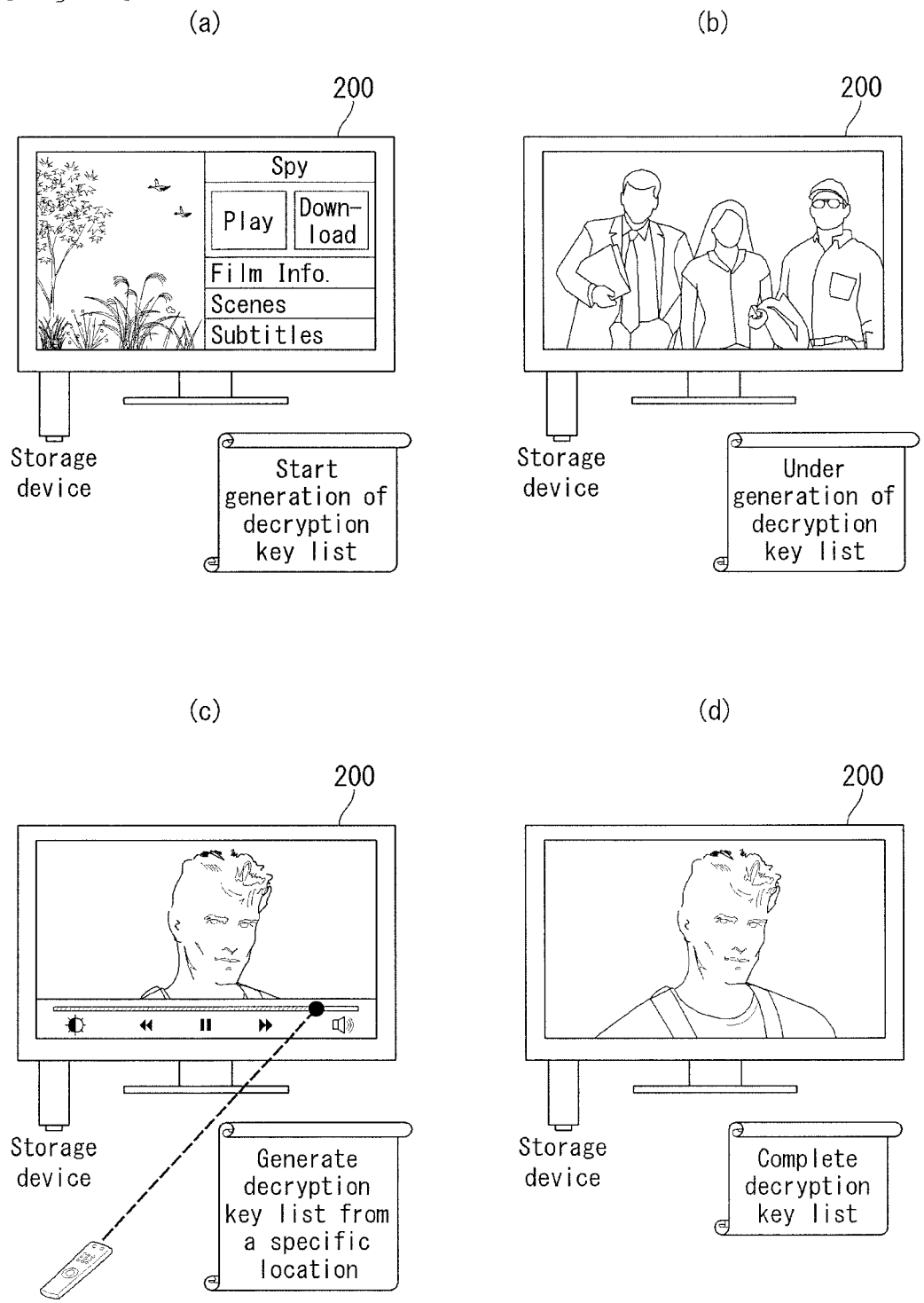
[Fig.13]

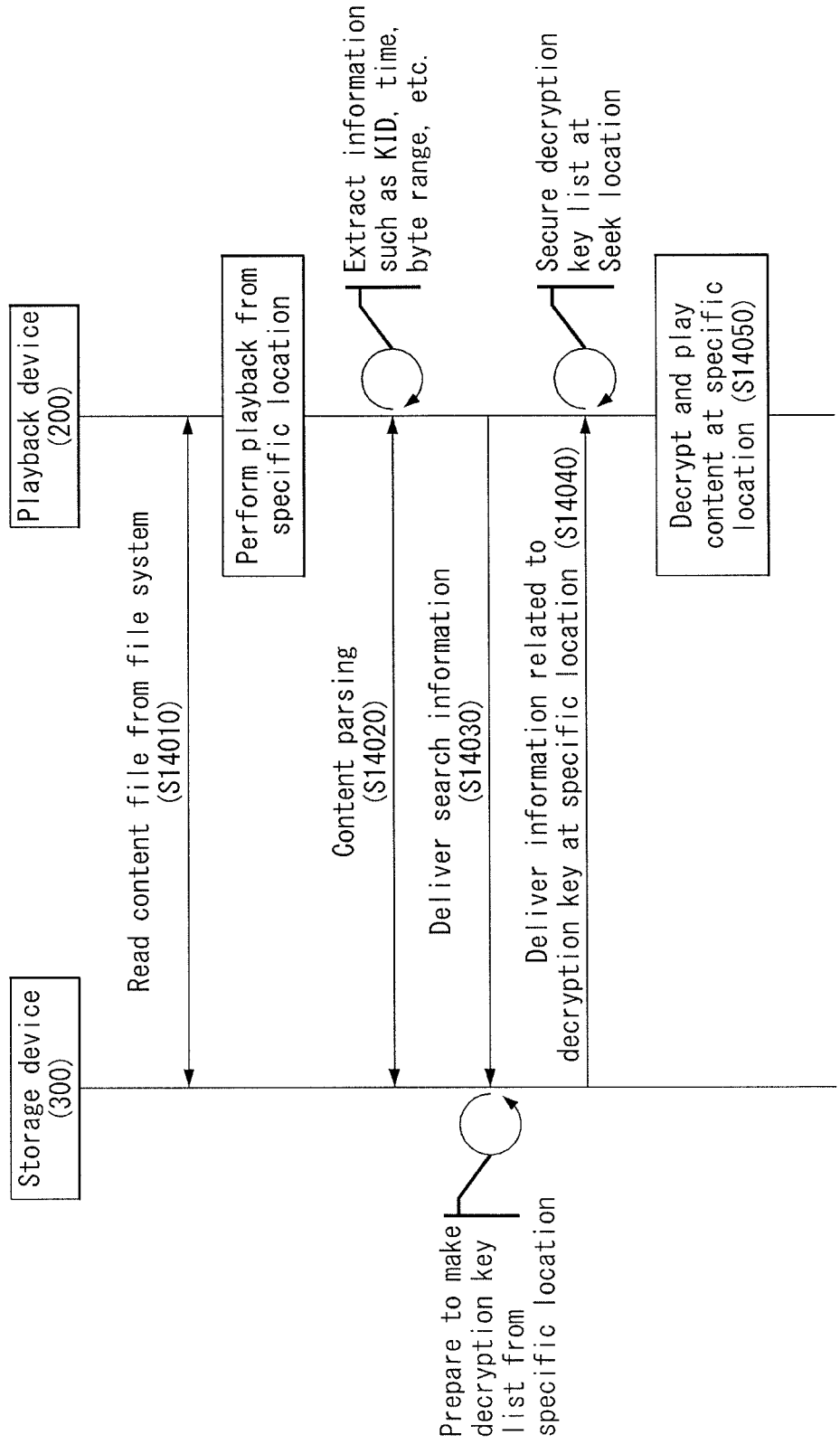
[Fig. 14]

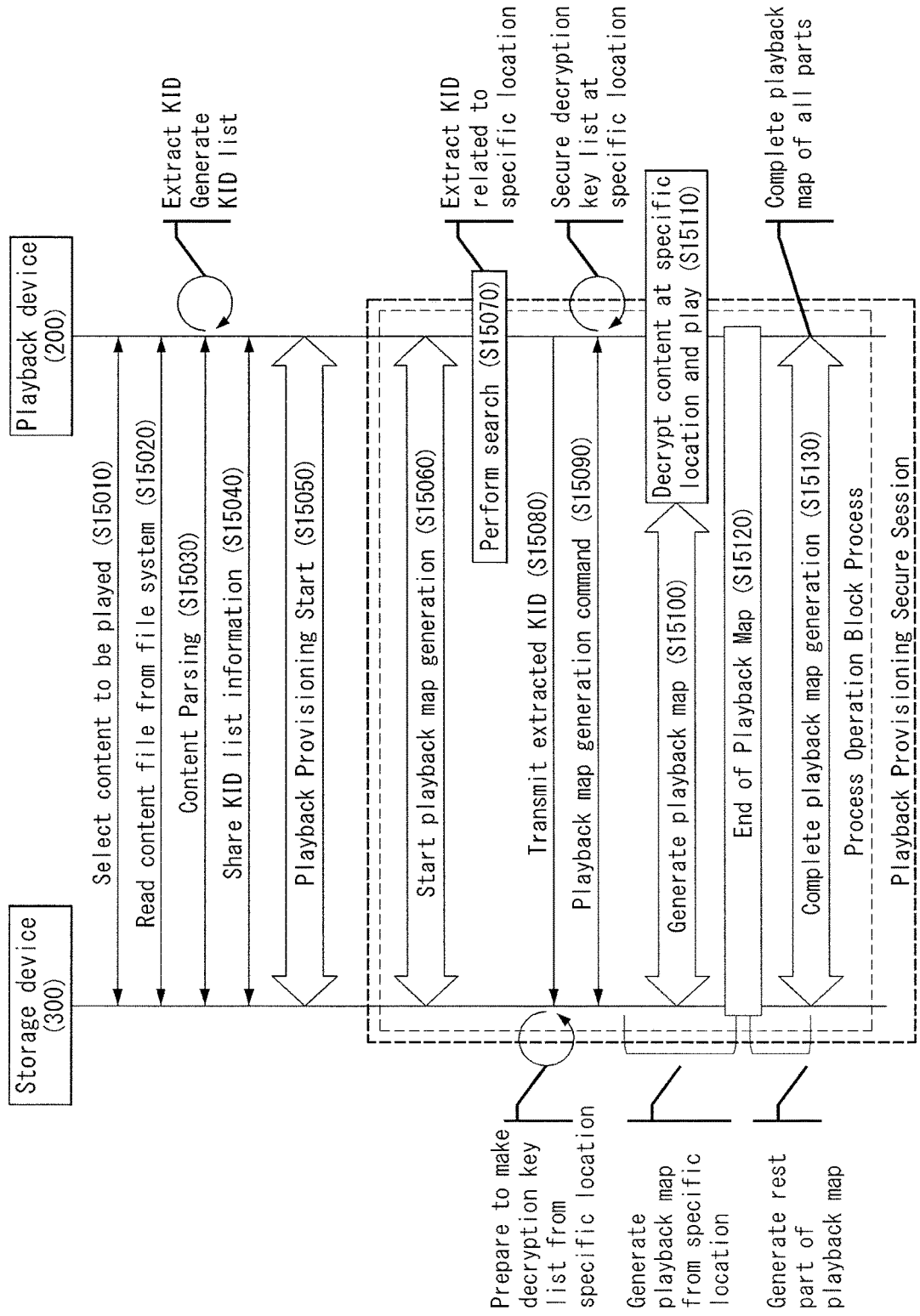
[Fig.15]

[Fig.16]
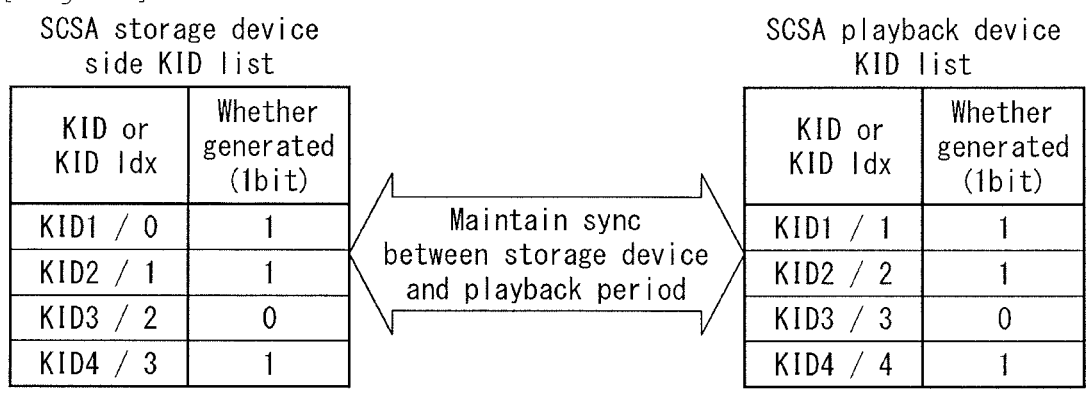

[Fig.17]
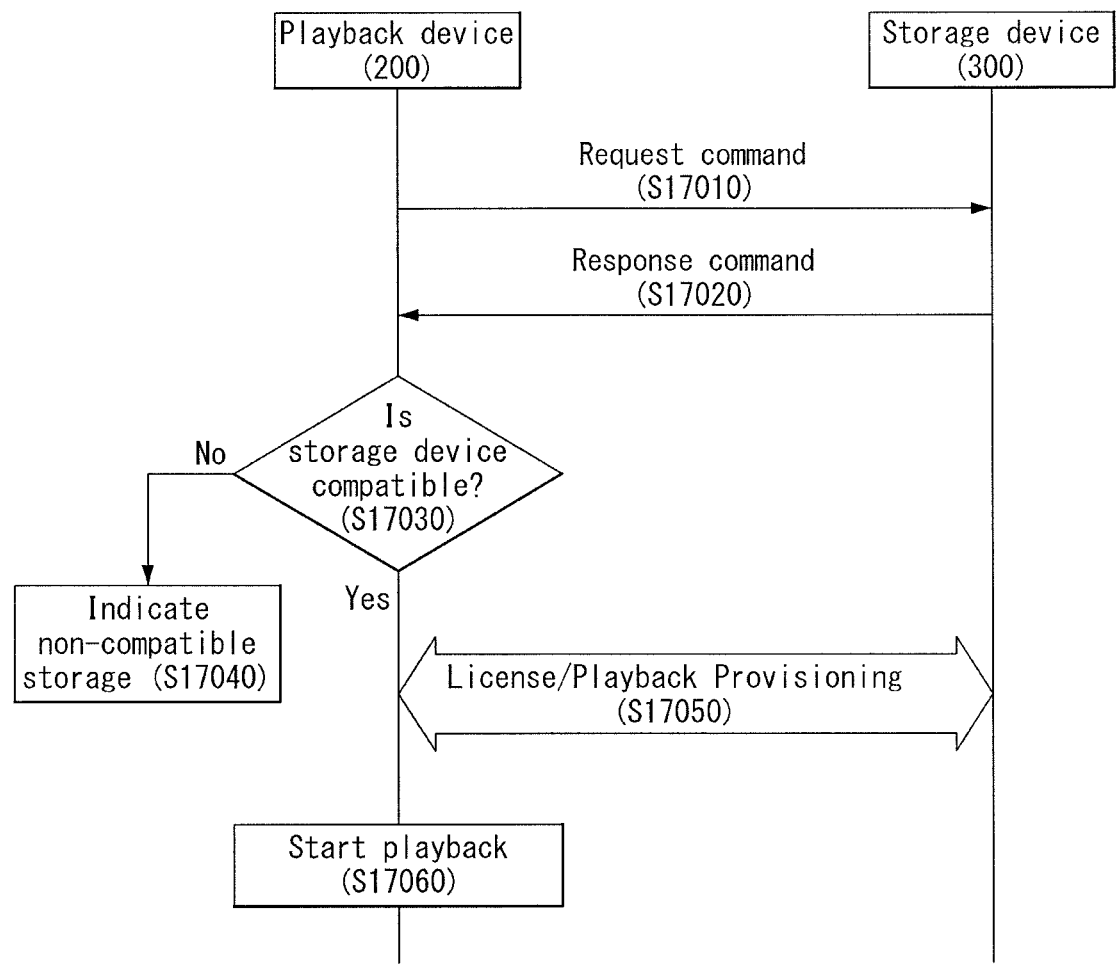

[Fig.18]

| Command Name | Op Code | Secure Session | Description |
|---|---|---|---|
| Get Device Capability | 0x0701* | No | Indicate information on version of technology supported storage and version information of technology guaranteeing backward compatibility for compatibility check between player and storage |

(a) Request/response command

| Offset | 31 30 29 28 27 26 25 24 23 22 21 20 19 18 17 16 | 15 14 13 12 11 10 9 8 7 6 5 4 3 2 1 0 |
|---|---|---|
| 0x00 | Player Version.major | Player Version.minor |
| 0x04 | Backward Compatible Version.major | Backward Compatible Version.minor |
| 0x08 | Reserved | |

(b) Request command

| Offset | 31 30 29 28 27 26 25 24 23 22 21 20 19 18 17 16 | 15 14 13 12 11 10 9 8 7 6 5 4 3 2 1 0 |
|---|---|---|
| 0x00 | Storage Version.major | Storage Version.minor |
| 0x04 | Backward Compatible Version.major | Backward Compatible Version.minor |
| 0x08 | Reserved | |

(c) Response command

| Field | Byte Length | Description |
|---|---|---|
| Player Version | 4 | Version of technology supported by player Expressed as major.minor format (ex.: 01.00) |
| Storage Version | 4 | Version of technology supported by storage Expressed as major.minor format (ex.: 01.00) |
| Backward Compatible Version | 4 | Indicate version of technology guaranteeing backward compatibility Indicate minimum version name for guaranteeing compatibility between player and storage |

(d) Description of each parameter

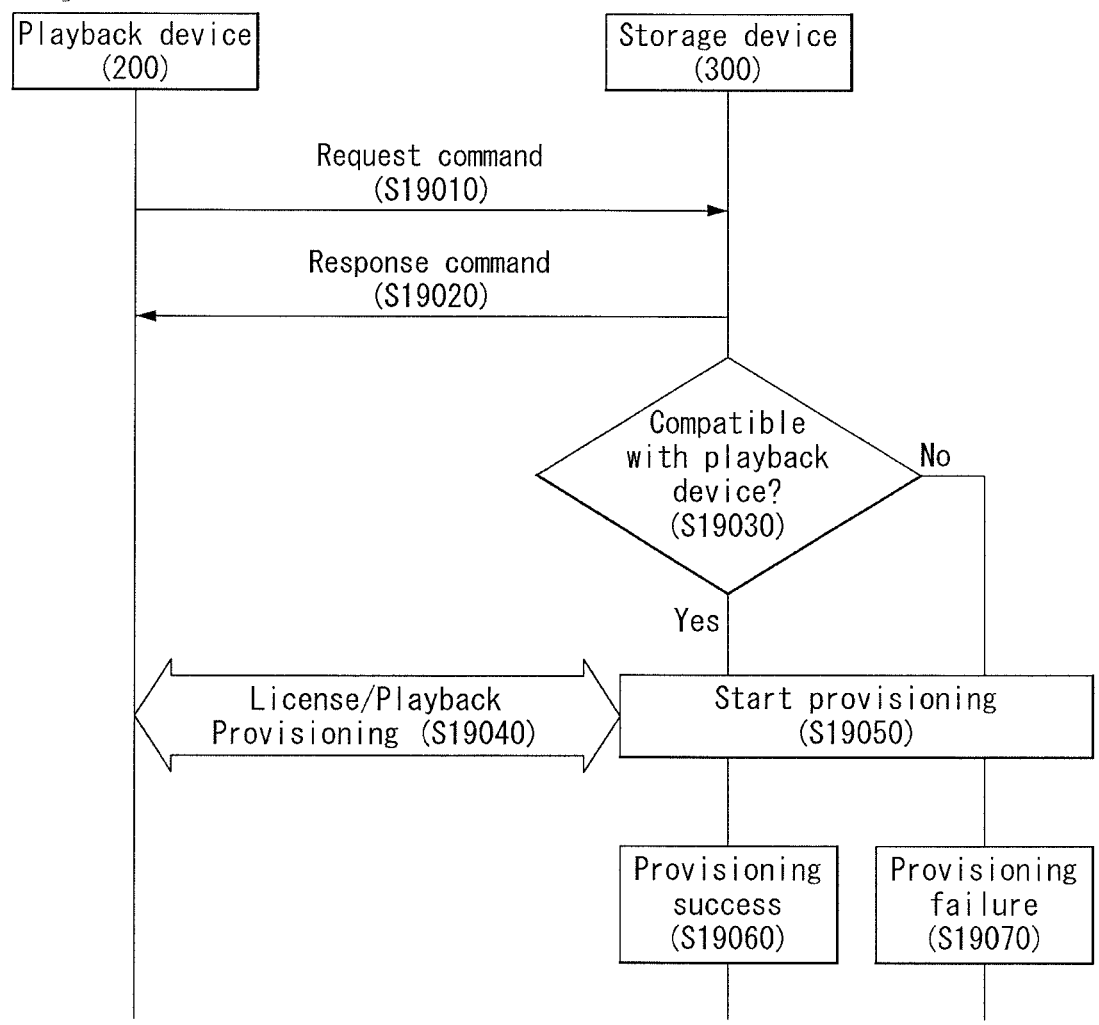

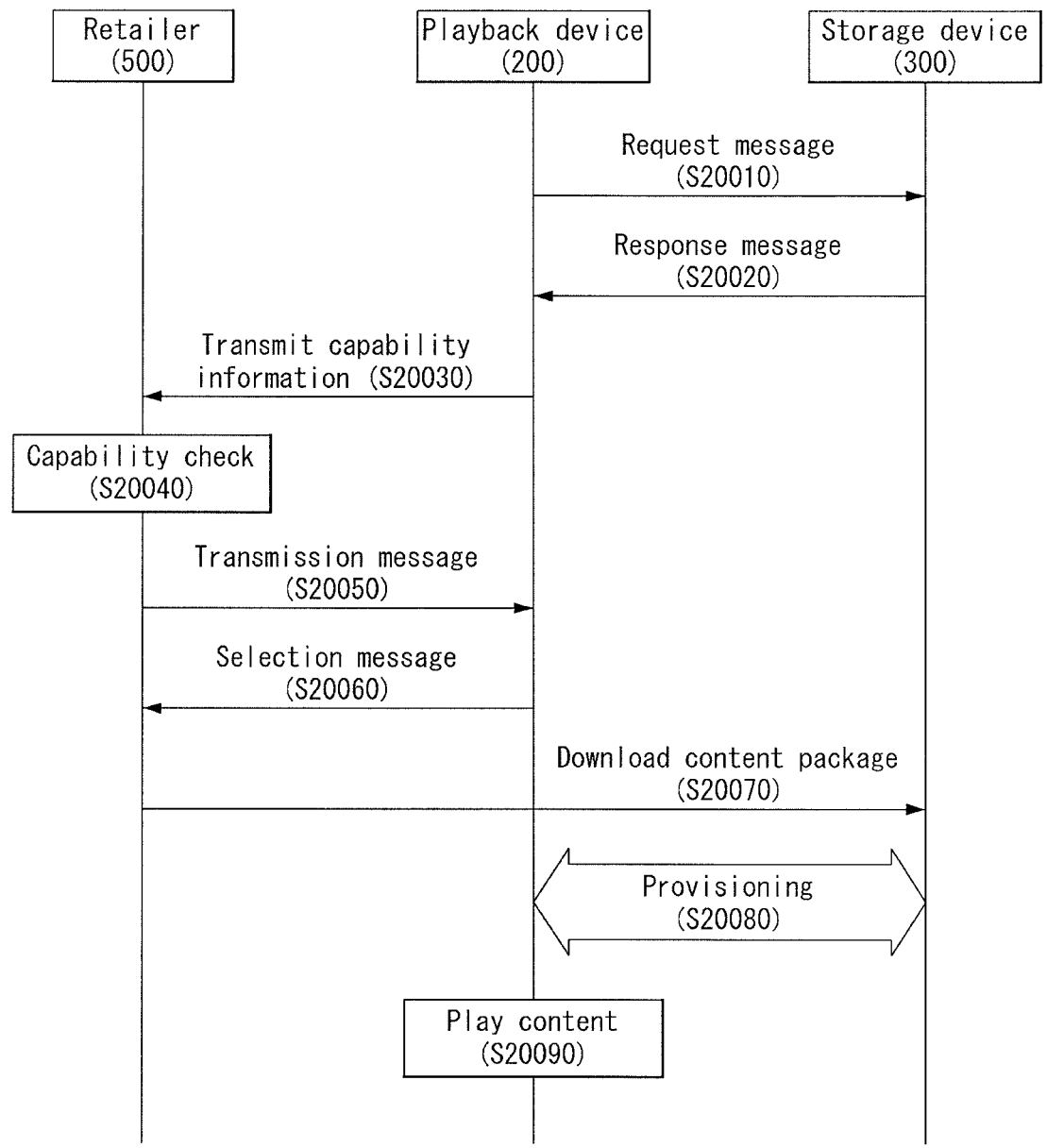
[Fig.20]

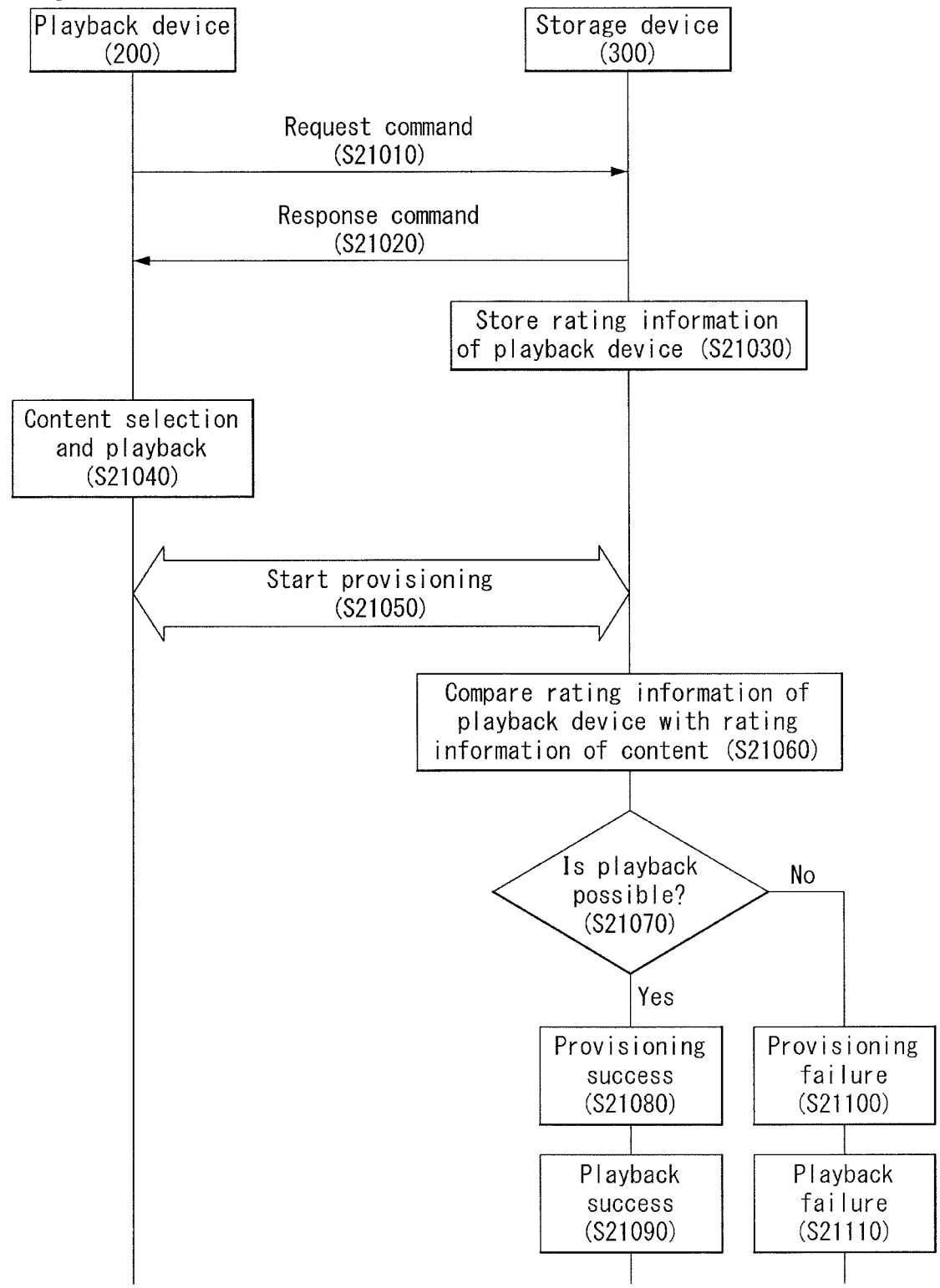

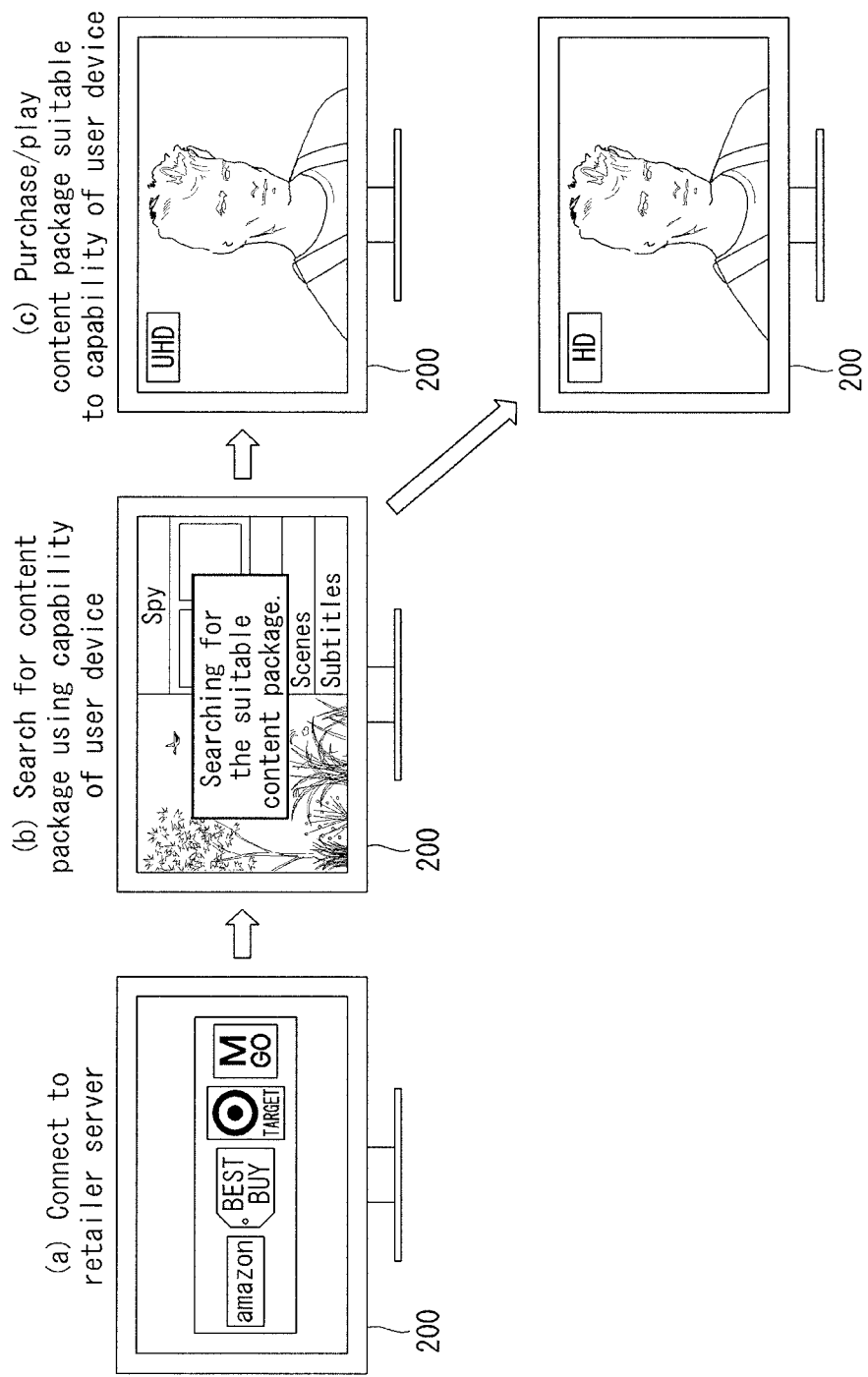
[Fig. 22]

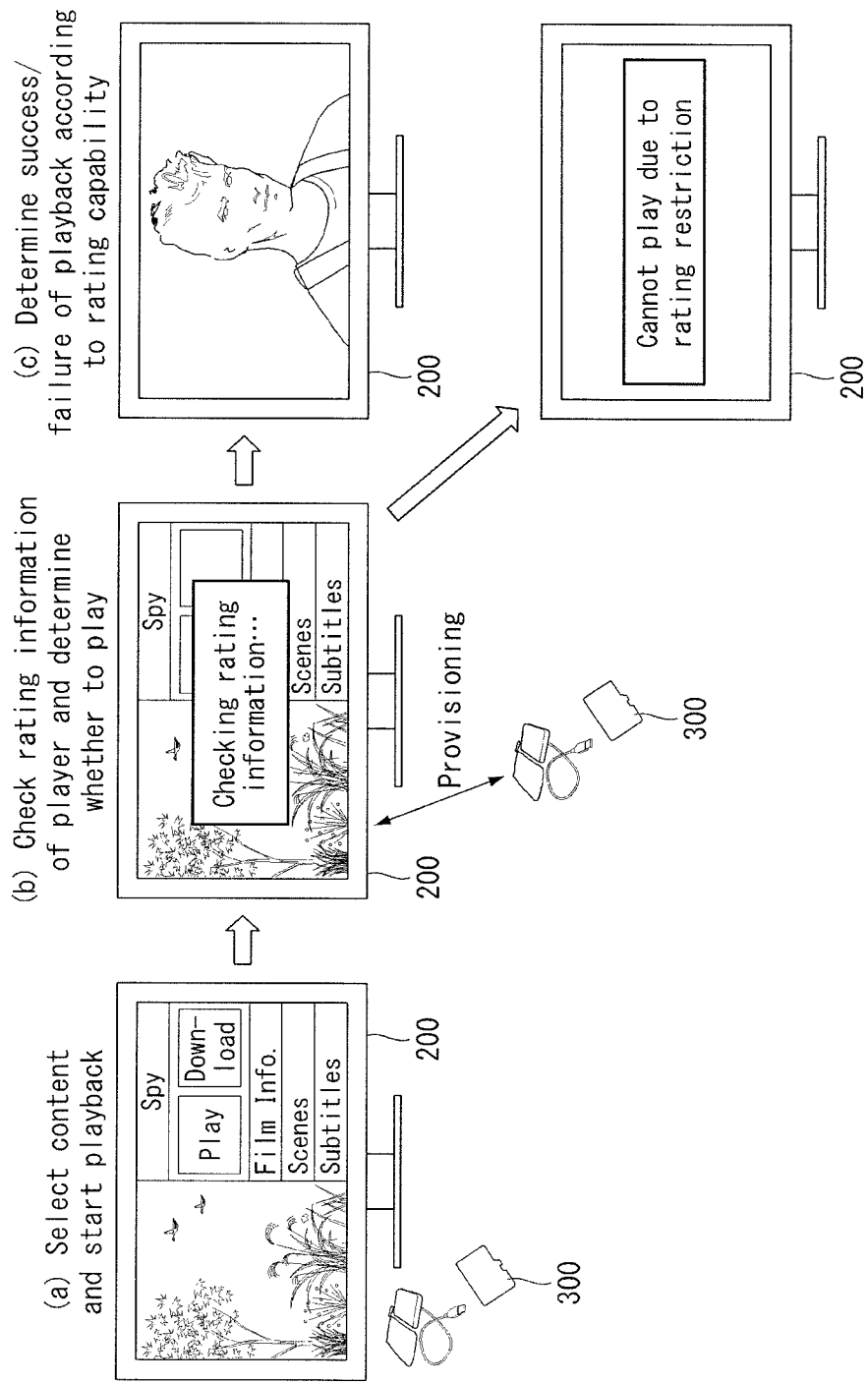

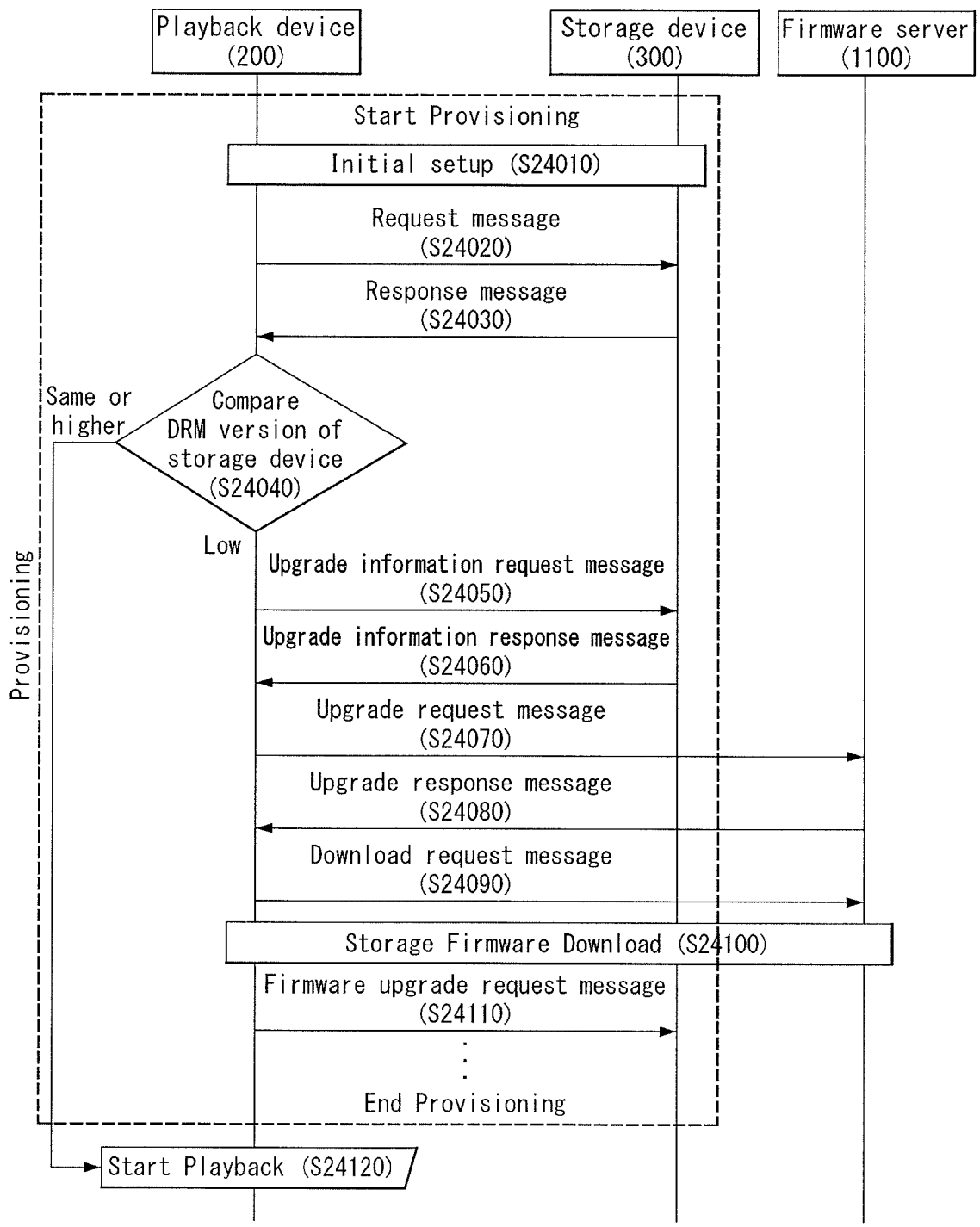

[Fig.25]
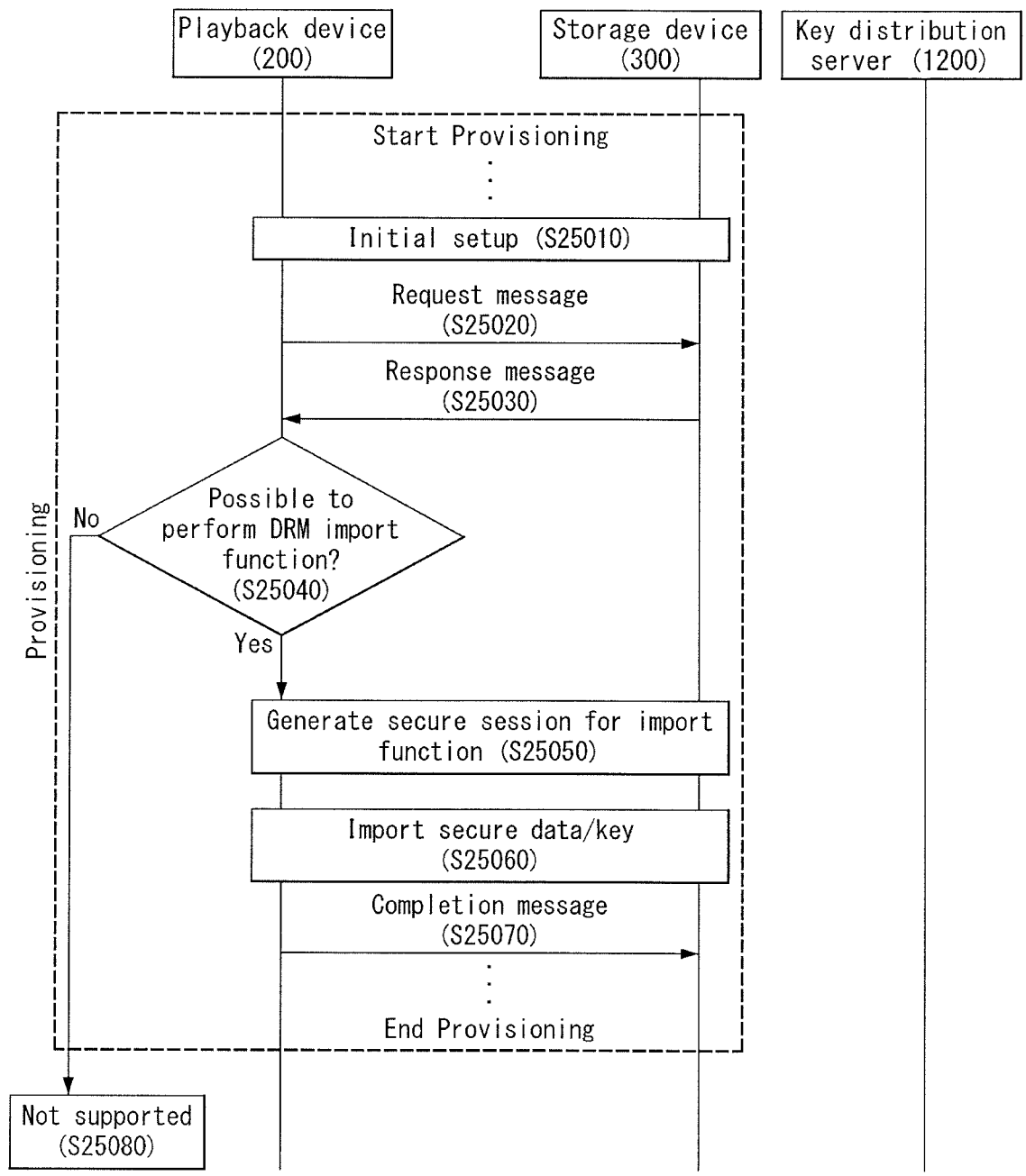

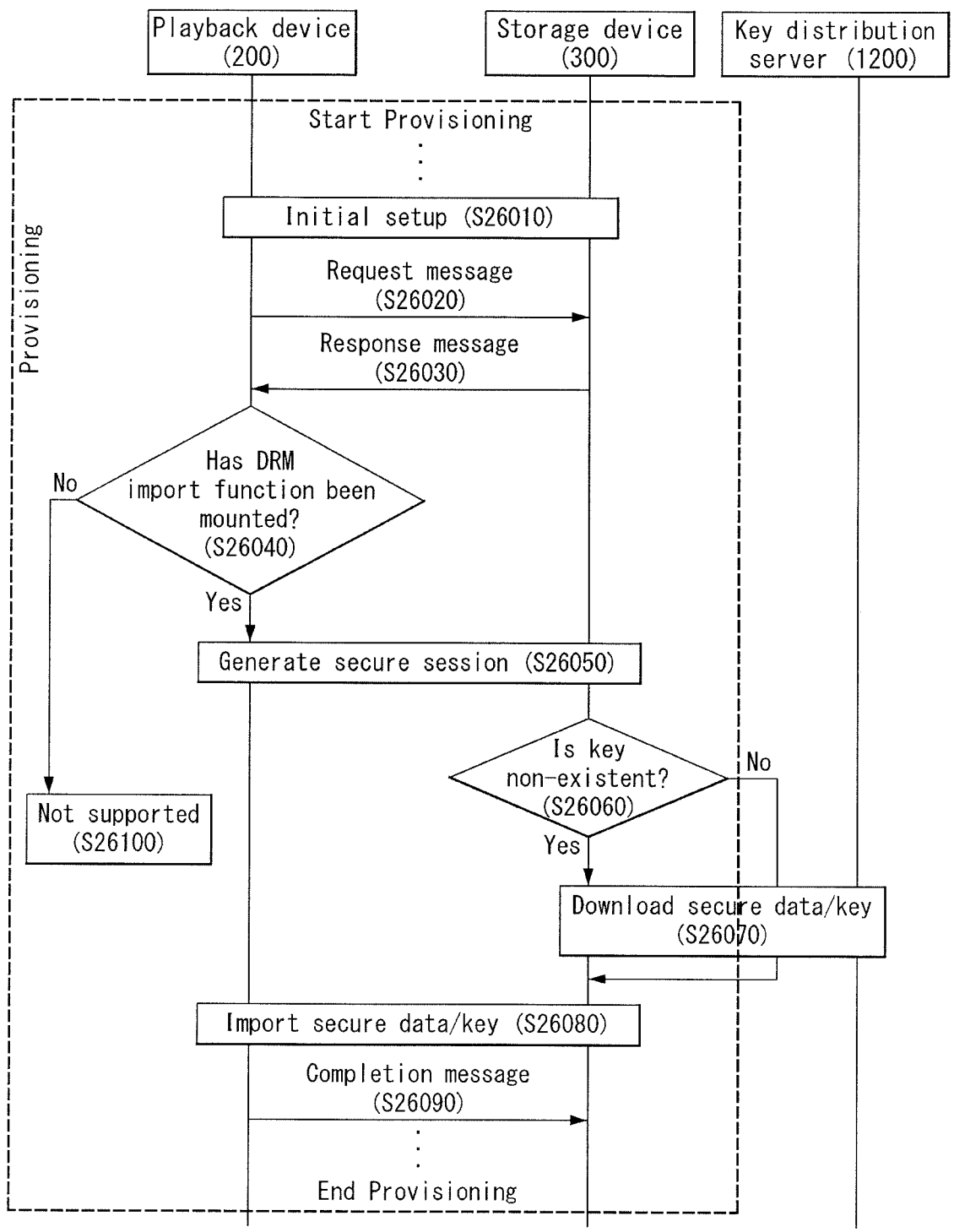

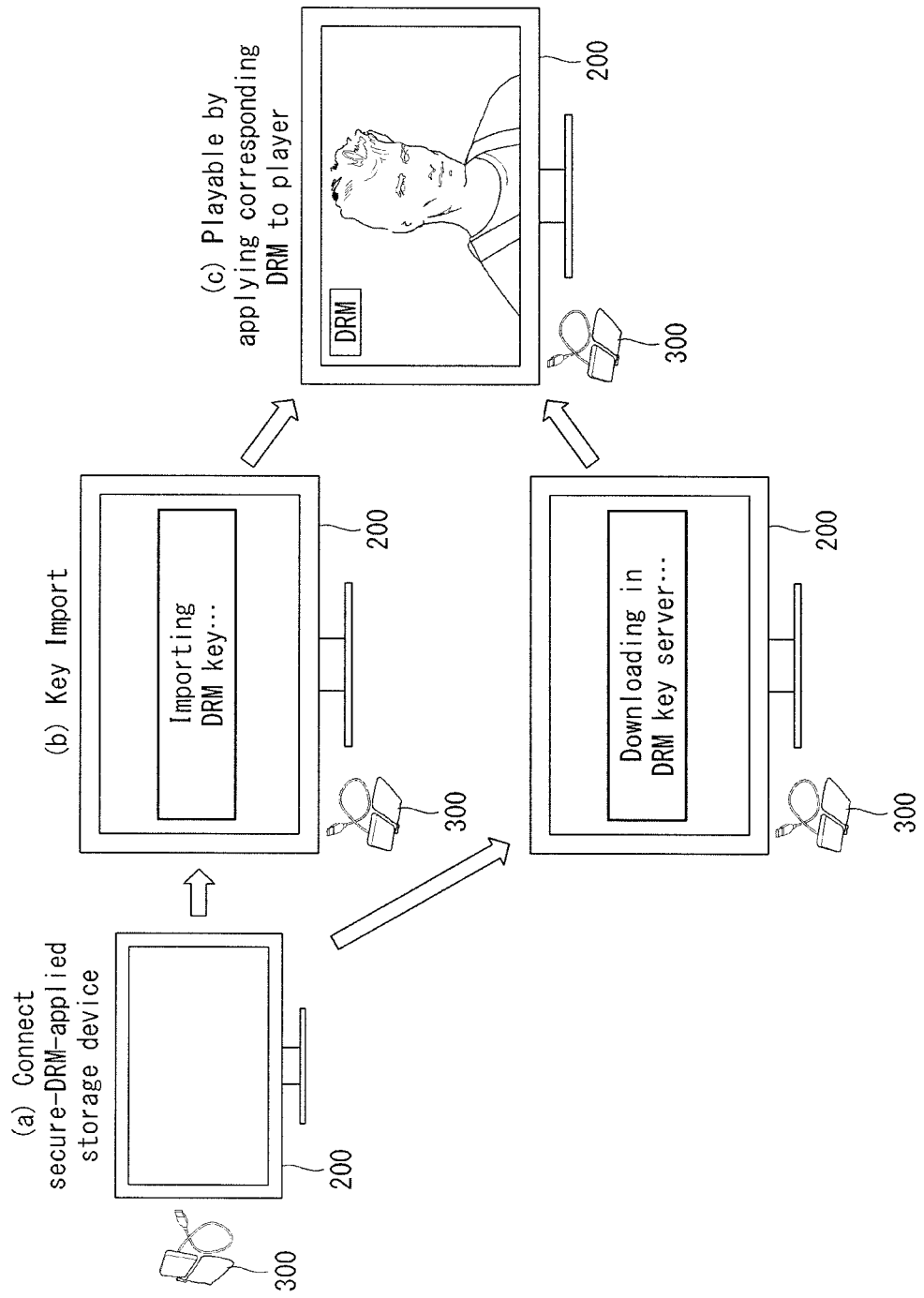

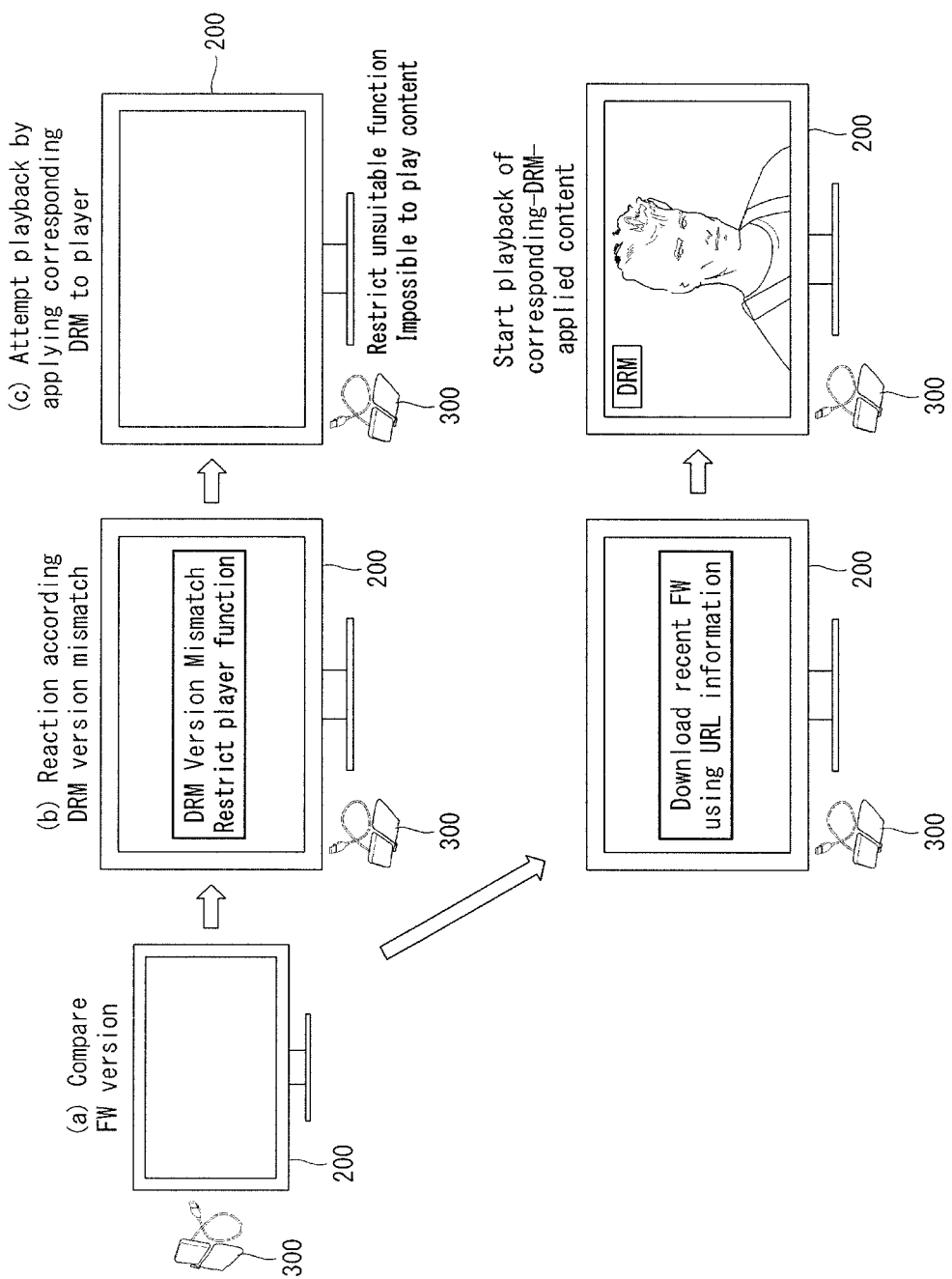

CONTENT REPRODUCTION METHOD AND DEVICE

CROSS REFERENCE TO RELATED APPLICATIONS

This application is the National Phase of PCT International Application No. PCT/KR2015/007396, filed on Jul. 16, 2015, which claims priority under 35 U.S.C. 119(e) to U.S. Provisional Application No. 62/058,671, filed on Oct. 2, 2014, 62/075,256, filed on Nov. 5, 2014, 62/079,563, filed on Nov. 14, 2014, all of which are hereby expressly incorporated by reference into the present application.

TECHNICAL FIELD

The present invention relates to a method and device for playing content and, more particularly, to a method and device for playing content stored in a storage device in an appliance constituting a network service or playing content transmitted through an external device or an Internet server. Further, the present invention relates to a method and apparatus for managing license information and a security key in order to play content.

BACKGROUND ART

Recently, as smartphones and smart TVs have adopted ultra-high definition (UHD) technology beyond full HD, various types of full HD or UHD content are anticipated to be encountered in several fields such as movie, concerts, and sports, as well as air channel broadcasting in the future.

However, if existing playback devices are not able to play various types of full HD and UHD content, users cannot use such content. Thus, playback devices are required to play full HD and UHD content, and a scheme enabling even an existing playback device to play such content may be required.

In order to play HD content, users need to be authorized to do it, and in order to more effectively manage HD content, a method for managing HD content may be required. Also, in order to properly distribute and use HD content, a method for preventing copying may be required and a method for managing license information for playback of HID content may also be required.

DISCLOSURE

Technical Problem

An object of the present invention is to define a system architecture including a configuration of a device capable of playing secure high-definition content, a network configuration, and a transmission protocol between a server and a device.

Furthermore, an object of the present invention is to define a method and a file format for efficiently playing secure high definition content.

Furthermore, an object of the present invention is to provide a method and apparatus for playing secure high-definition content at a specific location.

Furthermore, an object of the present invention is to provide a method and apparatus for playing secure high-definition content by exchanging capability information between a playback device and a storage device.

Furthermore, an object of the present invention is to provide a method and apparatus for upgrading firmware of a storage device for playing secure high-definition content.

Furthermore, an object of the present invention is to provide a method and apparatus for transmitting security data and key through a security memory of a storage device.

Technical objects to be achieved by the present invention are not limited to the aforementioned objects, and those skilled in the art to which the present invention pertains may evidently understand other technical objects from the following description.

Technical Solution

In order to resolve the above-described problems, the present invention provides a method and apparatus for playing secure high-definition content.

Specifically, in an aspect of the present invention, a method of managing license information for playing content by a playback device includes receiving a certificate revision list (CRL) from a license server, receiving encrypted license information allowing the content to be played through a first session established between a storage device and the license server wherein the first session is identified by session identification information, and playing the content based on the license information.

The session identification information may indicate one of at least of two types of session statuses, wherein the at least of two types of session statuses includes a secure session and a non-secure session and wherein the first session indicates the secure session.

The method may further include receiving the content from the external server through a second session established between the storage device and the external server wherein the second session indicates the non-secure session.

The first session identification information indicating the secure session may be represented as 0x001 and second session identification information indicating the non-secure session may be represented as 0x000.

The step of playing of the content may include receiving a playback signal indicating playback of a specific position of the content, obtaining search information indicating the specific position from the content, transmitting the obtained search information to the storage device, receiving generation information for generating a decryption key list or the decryption key list generated based on the search information from the storage device, and playing the content at the specific location based on the decryption key included in the decryption key list.

The search information may include at least one of KID (media key ID) information indicating information related to the decryption key, time information indicating a playback time at the specific position, or byte range information indicating a size of the content at the specific position.

The KID (media key ID) information may include KID (media key ID) indicating the specific position or index information of the KID.

The method may further include transmitting list information of the KID included in the content.

In another aspect of the present invention, a playback device for managing license information for playing content includes a display unit for outputting a content and a control unit functionally connected to the display unit, wherein the control unit controls to receive a certificate revision list (CRL) from a license server, receive encrypted license information allowing the content to be played through a first session established between a storage device and the license server, and play the content based on the license information, wherein the first session is identified by session identification information.

The session identification information may indicate one of at least of two types of session statuses, wherein the at least two types of session statuses includes a secure session and a non-secure session and wherein the first session indicates the secure session.

The control unit may control to receive the content from the external server through a second session established between the storage device and the external server, wherein the second session indicates the non-secure session.

The first session identification information indicating the secure session may be represented as 0x001 and second session identification information indicating the non-secure session may be represented as 0x000.

The control unit may control to receive a playback signal indicating playback of a specific position of the content, obtain search information indicating the specific position from the content, transmit the obtained search information to the storage device, receive generation information for generating a decryption key list or the decryption key list generated based on the search information from the storage device, and play the content at the specific position based on the decryption key included in the decryption key list.

The search information may include at least one of KID (media key ID) information indicating information related to the decryption key, time information indicating playback time at the specific position, or byte range information indicating a size of the content at the specific position.

The KID (media key ID) information may include KID (media key ID) indicating the specific position or index information of the KID.

The control unit may control to transmit list information of the KID included in the content to the storage device.

Advantageous Effects

According to a method of playing high image quality content according to an embodiment of the present invention, even if a user plays secure high image quality content at a specific location, a play start time can be reduced by generating a decryption key from a specific location.

As such, the user can play secure high image quality content at a user-desired location without a separate waiting time or after a short waiting time.

Furthermore, according to an embodiment of the present invention, content playable in a playback device may be selectively shown by exchanging capability information between a playback device and a storage device.

Advantages which may be obtained by the present invention are not limited to the aforementioned advantages, and various other advantages may be evidently understood by those skilled in the art to which the present invention pertains from the following description.

DESCRIPTION OF DRAWINGS

FIG. 1 is a view illustrating a system for using secure high definition content service according to an embodiment to which the present invention is applied.

FIG. 2 is a schematic internal block diagram of a playback device for playing secure high definition content service according to an embodiment to which the present invention is applied.

FIG. 3 is a schematic internal block diagram of a storage device for storing secure high definition content service according to an embodiment to which the present invention is applied.

FIG. 4 is a view illustrating a network system structure for obtaining license information for playing secure HD content stored in a storage device.

FIG. 5 is a flow chart illustrating a process of providing content through a session established between devices according to an embodiment to which the present invention is applied.

FIG. 6 is a flow chart illustrating a process of providing license information through a session established between devices according to an embodiment to which the present invention is applied.

FIGS. 7 and 8 are views illustrating embodiments to which the present invention is applied, in which FIG. 7 is a block diagram illustrating establishment of a session between a license server and a plurality of storage devices through a single playback device, and FIG. 8 is a block diagram illustrating establishment of a session between a retailer and a plurality of storage devices through a single playback device.

FIGS. 9 and 10 are views illustrating embodiments to which the present invention is applied, in which FIG. 9 is a block diagram illustrating establishment of a session between a license server and a plurality of storage devices through a plurality of playback devices, and FIG. 10 is a block diagram illustrating establishment of a session between a retailer and a plurality of storage devices through a plurality of playback devices.

FIG. 11 is an internal block diagram of a certification device managing the right to play content through communication with a playback device according to an embodiment to which the present invention is applied.

FIG. 12 is an internal block diagram of a certification device and a playback device for managing the right to play content according to an embodiment to which the present invention is applied.

FIG. 13 is a view illustrating an example of a content play process at a specific location according to an embodiment to which the present invention is applied.

FIG. 14 is a flowchart illustrating a process of playing content at a specific location according to an embodiment to which the present invention is applied.

FIGS. 15 and 16 are an example of a flowchart and a KID list specifically illustrating a process of playing content at a specific location according to embodiments to which the present invention is applied.

FIGS. 17 and 18 illustrate a flowchart and a data format for describing a process for determining compatibility based on capability information of a storage device by a storage device according to embodiments to which the present invention is applied.

FIG. 19 is a flowchart illustrating a process for determining compatibility based on capability information of a playback device by a playback device according to an embodiment to which the present invention is applied.

FIG. 20 is a flowchart illustrating a process of receiving transmission of a playable list from a retainer according to an embodiment to which the present invention is applied.

FIG. 21 is a flowchart illustrating a process of playing content based on rating information having been set in a playback device according to an embodiment to which the present invention is applied.

FIG. 22 is a view illustrating an example of receiving transmission of a list of playable contents from a retailer according to an embodiment to which the present invention is applied.

FIG. 23 is a view illustrating an example of playing content based on rating information having been set in a playback device according to an embodiment to which the present invention is applied.

FIG. 24 is a flowchart illustrating an example of receiving transmission of firmware from a firmware server by a storage device according to an embodiment of the present invention is applied.

FIG. 25 is a flowchart illustrating an example of importing secure data/key from a storage device by a playback device according to an embodiment to which the present invention is applied.

FIG. 26 is a flowchart illustrating an example of receiving transmission of secure data/key from a key issuance sever by a storage device according to an embodiment to which the present invention is applied.

FIG. 27 is s view illustrating an example of importing or downloading secure data/key by a playback device according to an embodiment to which the present invention is applied.

FIG. 28 is a view illustrating an example of downloading firmware from a firmware server according to an embodiment to which the present invention is applied.

MODE FOR INVENTION

Hereinafter, elements and actions of embodiments of the present invention will be described below in more detail with reference to the accompanying drawings. However, the elements and actions illustrated in the drawings and described with reference thereto are set forth only as examples and do not limit the spirit of the invention or its key elements and actions.

The terms used in this specification were selected to include current, widely-used, general terms. However, in certain cases, a term may be one that was arbitrarily established by the applicant. In such cases, the meaning of the term will be defined in the relevant portion of the detailed description. As such, the terms used in the specification are not to be defined simply by the name of the terms but are to be defined based on the meanings of the terms as well as the overall description of the present invention.

FIG. 1 is a view illustrating a system for using secure high definition content service according to an embodiment to which the present invention is applied.

A system to which the present invention is applied may include a user 100 who purchases secure high definition content and uses the same, playback devices 200-1, 200-2, and 200-3 capable of playing the content, a storage device 300 in which the content has been stored or in which the content may be stored, a content provider 400 providing the content, a retailer 500 and an electronic kiosk 700 receiving the content and providing the received content to the user, and a download server 600 storing the content to allow the content to be downloaded, and a license server 800 providing license information allowing the content to be played. Also, the system may further include an external interface 900, for example, a remote controller, for controlling an operation of the playback devices.

In an embodiment to which the present invention is applied, the user who wants to use a secure high definition (HD) content service may use the service through various methods. The secure HD content may include, for example, secure content storage association (SCSA) content, and content mentioned in this disclosure may include the SCSA content.

In a first example, the user 100 may use the service by purchasing a storage device in which the secure high definition content has already been stored. For example, the content provider 400 may preload content, which is intended to be provided, to a portable hard drive such as a hard disk drive (HDD) or a solid state drive (SSD) or a flash memory product such as a universal serial bus (USB) flash drive or a secure digital (SD) card, and purchase the same, and the user may use the service by purchasing the storage device storing desired content.

In a second example, the user 100 may use the service by purchasing content from a retailer 500 providing the secure high definition content service. For example, the retailer 500 may receive content from the content provider 400 and provide the content service online or offline, and the user 100 may use the service by properly purchasing content from the retailer 500. Also, the user 100 may also use the service by purchasing the storage device from the retailer 500.

In this case, the retailer 500 may provide transaction information corresponding to content purchase to the user 100. Here, the transaction information is information regarding content transaction activity, which may refer to aggregation information of right information.

For example, the transaction information may correspond to one content item purchased by the user, and the right information may be information indicating a status for issuing a license for a storage device. Here, the one content item may include at least one content among SD, HD, UHD version content, and the content of each version is related to one right information.

The transaction information may include at least one of a serial number used for uniquely referring to each transaction, transaction identification information uniquely identifying each transaction, transaction status information indicating a status of a transaction, a transaction generation time information indicating a generation time of a transaction, a transaction identifier list provided by a retailer, a transaction type information identifying a transaction type, and retailer information who has created the right information or the transaction information. Here, the transaction identification information may provide a unique link regarding a corresponding transaction.

In a third example, the user 100 may play the content by inserting the storage device 300 storing secure high definition content into the playback device 200-1. For example, the playback device 200-1 may be any device which may be able to play multimedia content, such as a mobile device, a TV, a computer, a notebook computer, and a tablet PC.

In a fourth example, the user 100 may insert the storage device 300 in which the secure high definition content has been stored or may be stored into the first playback device 200-1, and play the content in the second playback device 200-2. Here, the first playback device 200-1 and the second playback device 200-2 may be connected by a network, and when the storage device 300 is inserted into the first playback device 200-1, power of the second playback device 200-2 may be automatically turned on. Also, content may be played in the second playback device 200-2 through an external interface (for example, the remote controller 800, or the like) or a user interface (for example, a touch screen, a voice, a gesture, and the like).

In a fifth example, the user 100 may insert the storage device 300 capable of storing secure high definition content into the playback device 200-3 and download the content from an external content server to thus play the content. Here, the content may be stored in the storage device 300, and the external content server may be a content server of the content provider 400 or the retailer 500.

In order to play the secure high definition content, a specific application may be required. The specific application mentioned in this disclosure may refer to a software program for playing secure high definition content. For example, the specific application may refer to a software program capable of playing copy-prevented high definition content which has been stored or may be stored in a portable hard drive such as an HDD or SSD or in a flash memory product such as a USB flash drive or an SD card.

In particular, in the case of a playback device unable to reproduce the secure high definition content, installation of the specific application may be essential to play the content.

FIG. 2 is a schematic internal block diagram of a playback device for playing secure high definition content service according to an embodiment to which the present invention is applied.

The playback device 200 may include a communication unit 210, a user interface 220, an external input/output terminal 230, an output unit 240, an encoder/decoder 250, a memory 260, a certification unit 270, a power supply unit 280, and a control unit 290. The communication unit 210 may include a reception unit 211 and a transmission unit 212, and the output unit 240 may include a display unit 241 and a speaker 242.

The communication unit 210 may include one or more modules allowing for wired/wireless communication between the playback device 200 and the convent server or between the playback device 200 and other electronic device connected by a network. For example, the reception unit 211 may receive a signal transmitted from the content server or the other electronic device through a channel. Here, the signal may include secure high definition content data. The transmission unit 212 may transmit information required for downloading or streaming the secure high definition content data to the content server or the other electronic device. For example, the information required for downloading or streaming the secure high definition content data may include at least one among identification information, transaction information, license information, level information, and certificate information of the playback device and/or the storage device. Here, the license information may be information allowing purchased content to be played and may include at least one of license file information and license key information, for example.

The user interface 220 serves to transfer input information from the user to the playback device 200. For example, in order to control playing of the secure high definition content, in order to input information required for purchasing or certification procedure, or in order to perform setting for playing in other electronic device, the user interface 220 may be used. The user interface 220 may include a touch screen unit (not shown), a voice recognition unit (not shown), or a gesture recognition unit (not shown), and may be a separate external device such as a remote controller.

The external input/output terminal 230 may serve as a passage with an external device connected to the playback device 200. The external input/output terminal 230 may receive data or power from an external device and transfer the same to each component of the playback device 200, or transmit data within the playback device 200 to an external device. For example, the external input/output terminal 230 may be a connection terminal for connection with the storage device 300 and may include at least one among a USB port, a HDMI port, a wired/wireless headset port, an external charger port, a wired/wireless data port, a memory card port, an audio input/output (I/O) port, a video I/O port, and an earphone port. The storage device 300 and the playback device 200 may communicate through the external input/output terminal 230.

The output unit 240, serving to generate an output related to sight and hearing, may include the display unit 241 and the speaker 242.

The display unit 241 may output visual information processed in the playback device 200. For example, the display unit 241 may output secure high definition content, output information indicating that the storage device 300 has been plugged in, or output information required for a process of purchasing or certifying content. The display unit 241 may include at least one among a liquid crystal display (LCD), a thin film transistor liquid crystal display (TFT LCD), an organic light emitting diode (OLED), a flexible display, and a 3D display.

The speaker 242 may output acoustic information processed in the playback device 200. For example, the speaker 242 may output audio information of content or information required for playing the content, as voice information.

The encoder/decoder 250 may be used to perform decoding to display the secure high definition content or may be used to encode an image signal or an audio signal input from the playback device 200.

The memory 260 may store a program for operation of the control unit 290 or may temporarily store input/output data. For example, the memory 260 may store a specific application for playing the secure high definition content or may store identification information, profile information, level information, and certificate information of the playback device 200 and meta data of the content.

The memory 260 may include at least one type of storage mediums among a flash memory type, a hard disk type, a multimedia card micro-type, a card-type memory (e.g., an SD or XD memory, etc.), a random access memory (RAM), a static random access memory (SRAM), a read only memory (ROM), an electrically erasable programmable read only memory (EEPROM), a programmable read only memory (PROM), a magnetic memory, a magnetic disk, and an optical disk. Also, the playback device 200 may operate in relation to a Web storage performing a storage function of the memory 260 on the Internet.

The certification unit 270 may decrypt encrypted content to play the content. Here, the certification unit 270 may perform a response checking process regarding key information, and may transmit and receive right information of a storage device or a playback device.

The power supply unit 280 may receive external power and/or internal power and supply power required for operation of each component under the control of the control unit 290.

The control unit 290 controls a general operation of the playback device 200. For example, the control unit 290 may control an operation of detecting whether the storage device 300 is connected, receiving certificate information from the detected storage device, or transmitting the received certificate information to a server. Also, the control unit 290 may control an operation of receiving an encrypted media file and a certificate list (or a certificate revision list (CRL)) from the server on the basis of the certificate information, storing the encrypted media file to the storage device, update the certificate list, or playing the encrypted media file on the basis of the updated certificate list.

FIG. 3 is a schematic internal block diagram of a storage device for storing secure high definition content service according to an embodiment to which the present invention is applied.

The storage device 300 to which the present invention is applied may include an interface 310, a file system 330, and a secure information management unit 350. The file system 330 may include a data storage unit 331 and an updating unit 333, and the secure information management unit 350 may include a control unit 351, a decryption unit 353, and a storage unit 355.

The interface 310 serves as a passage with an external device connected to the storage device 300. For example, when the storage device 300 is plugged in to a playback device, the storage device 300 may receive data from the playback device or transmit internal data of the storage device 300 to the playback device through the interface 310.

The data storage unit 331 may store license information, password information, and the certificate revision list required for playing the encrypted multimedia content data.

The updating unit 333 may receive the certificate revision list and synchronize the received certificate list with previously stored certificate list, thus updating the certificate list. Here, the certificate revision list may be received from the playback device or an external server.

The secure information management unit 350 may be connected to a license server through the playback device, and may perform a handshake process with the license server regarding the license information, the password information, and the certificate list required for playing content. The control unit 351 of the secure information management unit 350 may control the forgoing process, and the decryption unit 353 may decrypt the license information or the password information. The storage unit 355 may store the license information and/or the password information, and the storage unit 355 may be a secure region within the storage device 300.

FIG. 4 is a view illustrating a network system structure for obtaining license information for playing secure HD content stored in a storage device.

In order for the user to purchase HD content and play it in a playback device, the user needs to obtain at least one of transaction information and license information corresponding to the HD content. Here, the transaction information refers to information regarding a content transaction activity, which may refer to aggregation information of right information. The transaction information and the right information are the same as those described above with reference to FIG. 1. The license information is information allowing purchased content to be played and may include at least one of license file information and license key information, for example.

In the present embodiment, a process of obtaining license information to play HD content will be described.

Referring to FIG. 4, the user 100 may purchase secure HD content from the retailer 500 (401). In the present embodiment, the retailer 500 is taken as an example, but content may also be purchased through any other route or other content retainer, for example, the content provider 400 or other user.

The retailer 500 may also request content purchase from the content provider 400 or another retailer 500 (403), and may be provided with content therefrom (404).

Upon receiving the purchase request from the user 100, the retailer 500 may provide the right to play HD content to the user through generation of transaction information. For example, the retailer 500 may provide transaction information to the user 100 (402), and provide transaction details to the license server 800 (405). Here, the provided transaction information may be stored in the storage device 300 and may correspond to one HD content. The HD content may be provided as content of a plurality of versions, and may be provided as one or more of SD, HD, UHD class content. Also, the retailer 500 may provide HD content to the storage device 300 (406).

The license server 800 may include an interface and data required for determining whether the storage device has the right to play content. The license server 800 may receive the transaction details from the retailer 500, receive content code information from the content provider 400 (407), and receive the transaction information from the storage device 300 (408).

The license server 800 may generate transaction information on the basis of the transaction details. Also, the transaction information may be generated by the retailer 500.

Meanwhile, the user 100 may request the playback device 200 to play the purchased HD content through an interface. Here, the transaction information stored in the storage device 300 may be transmitted to the license server 800, and the license server 800 may check whether there is right to play on the basis of the transaction information. When it is checked that there is right to play, the license server 800 may generate right information and license information and transmit the generated right information and license information to the storage device 300 (409). Here, the license information is information allowing the purchased content to be played, and may include at least one of license file information and license key information.

Upon receiving the right information and the license information, the storage device 300 may play the HD content.

FIG. 5 is a flow chart illustrating a process of providing content through a session established between devices according to an embodiment to which the present invention is applied.

In order to play the secure HD content, the playback device 200 may use at least one of a certificate list, encryption information, device identification information, device certificate information, storage device certificate information, and storage device identification information.

First, when the storage device 300 storing the secure HP content is plugged into the playback device 200, the playback device 200 may request device certificate information of the storage device 300 from the storage device 300 (S5010). When the request for the device certificate information is received, the storage device 300 transmits the device certificate information to the playback device 200 (S5020), and the playback device 200 transmits the device certificate information to the download server 600 (S5030). Here, the download server 600 refers to a server storing a content file, and the download server 600 may include a certification server (not shown) for certifying content, a storage device, or a playback device.

The download server 600 receives the device certificate information of the storage device 300 and determines whether the device certificate information is valid. For example, the download server 600 may determine whether the device certificate information of the storage device 300 is identical to any one of pieces of device certificate information managed by the download server 600. In a case in which the device certificate information of the storage device 300 is not valid according to a determination result, the playback device 200 cannot play the secure HD content.

In contrast, when the device certificate information of the storage device 300 is valid according to the determination result, the download server 600 transmits an encrypted content file to the playback device 200 (S5040) and the playback device 200 transmits the encrypted content file to the storage device (S5050).

The storage device 300 may store the encrypted content file, and here, the received encrypted content file may be stored in the file system of the storage device 300 (S5060).

The encrypted content file may include content level information, and the content level information indicates categorized content attribute information. A content file provided in the system to which the present invention is applied may be provided as a different profile according to the content level information. For example, in a case in which the content level information is "Level 1", content may correspond to a standard definition (SD) profile, and in a case in which the content level information is "Level 2", content may correspond to a high definition (HD) profile, and in a case in which the content level information is "Level 3", content may correspond to a quad-high definition (QHD) profile.

Also, the playback device 200 may be provided with various levels according to capability thereof. For example, whether a playback device is able to play HD content may be determined on the basis of a level thereof. For example, in a case in which device level information indicates "Level 1", the playback device may play content corresponding to "Level 1", in a case in which the device level information indicates "Level 2", the playback device may play content corresponding to "Level 1" and Level 2", and in a case in which the device level information indicates "Level 1", the playback device may play content corresponding to every content level information.

Meanwhile, the download server 600 transmits the certificate revision list to the storage device 300 (S5070). Upon receiving the certificate revision list, the storage device 300 synchronizes the received certificate revision list with a previously stored certificate list to update the certificate list (S5080). Here, the certificate list refers to a list of pieces of certificate information required for playing the secure HD content, and includes at least one of a content title certificate list, a storage device certificate list, a playback device certificate list, and a license certificate list, for example. The certificate list may be used to certify eligibility of at least one of the playback device, the storage device, and the server, and may be stored in a secure region of the storage device.

Since the certificate list of the storage device 300 is updated as described above, a secure session may be established between the storage device 300 and the playback device 200 or between the storage device 300 and the download server 600, and secure information such as a license key may be transmitted and received through the secure session.

Thus, on the basis of the updated certificate list, the playback device 200 may play the encrypted content file stored in the storage device 300. The encrypted content file may be played on the basis of a specific application installed in the playback device 200.

In this manner, a session is established when information is transmitted between devices in the system to which the present invention is applied, a command may be transmitted through the session, and a response thereto may be received. Here, the session may be identified by session identification information, and the session identification information may be distinguishably defined according to whether key information for protecting content is exchanged or may indicate whether key information for protecting content is exchanged.

For example, the session identification information may indicate one of at least two types of session statuses, and the at least two types of session statuses may include a secure session and non-secure session. Here, the secure session refers to a session in which key information for protecting content can be exchanged, and the non-secure session refers to a session in which key information for protecting content cannot be exchanged. That is, in the case of the non-secure session, an independent command is allowed in a certificate process for exchanging key information.

Here, the secure session and non-secure session are terms defined in this disclosure and may be replaced with other terms having the same meaning. For example, the secure session and non-secure session may be referred to as a local session or a network session.

In an embodiment to which the present invention is applied, the session identification information may be represented by 16 hexadecimal but is not limited thereto. For example, first session identification information indicating the secure session may be represented as 0x0001, and second session identification information indicating non-secure session may be represented as 0x0000.

Meanwhile, the session identification information may be included in a command or a response message thereto and transmitted. The session identification information included in the command may refer to a session identifier allocated by a storage device, and the session identification information included in the response message with respect to the command may have the same value as that of the session identification information included in the command.

FIG. 6 is a flow chart illustrating a process of providing license information through a session established between devices according to an embodiment to which the present invention is applied.

In order to play an encrypted content file in a file system of a storage device, the storage device needs to obtain license information. FIG. 6 illustrates a process of obtaining license information by the storage device.

In order to receive license information, first, the storage device 300 may be connected to the license server 800. Here, the storage device 300 may be connected through a playback device. The license server 800 may receive a certificate list of the storage device 300 from the storage device 300 and determine whether the received certificate list is a certificate revision list. In a case in which the certificate list of the storage device 300 is not a certificate revision list, the license server 800 may request the storage device 300 to update the certificate list (S6010). Here, the certificate list may be a certificate revision list obtained from a key issuance center.

The storage device 300 may receive the certificate revision list and synchronize it with the previously stored certificate list to update the certificate list. Here, the certificate list refers to a list of pieces of certificate information required for playing the secure HD content, and includes at least one of a content title certificate list, a storage device certificate list, a playback device certificate list, and a license certificate list, for example. The certificate list may be used to certify eligibility of at least one of the playback device, the storage device, and the server, and may be stored in a secure region of the storage device.

As the license server 800 and the storage device 300 exchange certificate information of the storage device 300, whether the storage device 300 is a certified storage device may be determined (S6020). Thereafter, the license server 800 and the storage device 300 may exchange a public key (S6030).

After exchanging the public key, the license server 800 may encrypt the license key (S6040). The license server 800 may transmit the encrypted license key and the license file to the storage device 300 (S6050 and S6070).

Upon receiving the encrypted license key and the license file, the storage device 300 may decrypt the encrypted license key (S6060) and store the license file in a secure region of the storage device 300 (S6080).

In this manner, the certificate list of the storage device 300 may be updated, whereby a secure session may be established between the storage device 300 and the license server 800 and secure information such as the license key may be transmitted and received through the secure session. Thus, on the basis of the updated certificate list, the playback device may play the encrypted content file stored in the storage device 300.

FIGS. 7 and 8 are views illustrating embodiments to which the present invention is applied, in which FIG. 7 is a block diagram illustrating establishment of a session between a license server and a plurality of storage devices through a single playback device, and FIG. 8 is a block diagram illustrating establishment of a session between a retailer and a plurality of storage devices through a single playback device.

A session is established when information is transmitted between devices within the system to which the present invention is applied, and here, the session may be a plurality of secure sessions. For example, in a case in which a storage device 1 300-1 and a storage device 2 300-2 are connected to a playback device 1 200, the playback device 1 200 may have a plurality of secure sessions. In a case in which the plurality of secure sessions are established, a function of copying or moving content may be more conveniently performed.

In a case in which the user purchases content, a piece of transaction information may be generated. Here, devices within the system to which the present invention is applied may need to establish a session with one or more protocols. For example, the playback device 1 200 may be connected to the storage device 1 300-1 and the storage device 2 300-2 to separately establish sessions. When the user requests copying content from the storage device 1 300-1 to the storage device 2 300-2, the playback device 1 200 should simultaneously maintain protocols with the storage device 1 300-1 and the storage device 2 300-2. Here, the playback device 1 200 may identify respective protocols by checking at least one of storage device identification information or session identification information.

As illustrated in FIG. 22, the license server 800 may establish secure sessions with the storage device 1 300-1 and the storage device 2 300-2, respectively, though the playback device 1 200. Here, the respective secure sessions may be identified by separate session identification information. The playback device 1 200 may simultaneously play content A of the storage device 1 300-1 and content B of the storage device 2 300-2, and here, the content A and the content B may be played in different windows.

As illustrated in FIG. 23, the retailer 500 may also establish secure sessions with the storage device 1 300-1 and the storage device 2 300-2, respectively, through the playback device 1 200. Similarly, the respective secure sessions may be identified by separate session identification information.

Through the established secure sessions, secure information such as a license key may be transmitted and received. Thus, on the basis of the license information, the playback device 1 200 may play the encrypted content files stored in the storage device 1 300-1 and the storage device 2 300-2.

FIGS. 9 and 10 are views illustrating embodiments to which the present invention is applied, in which FIG. 9 is a block diagram illustrating establishment of a session between a license server and a plurality of storage devices through a plurality of playback devices, and FIG. 10 is a block diagram illustrating establishment of a session between a retailer and a plurality of storage devices through a plurality of playback devices.

When information is transmitted between devices within the system to which the present invention is applied, a session is established, and here, the session may be a plurality of secure sessions. Here, in a case in which a playback device is in plurality, a plurality of secure sessions may be established for each transaction. For example, in a case in which the storage device 1 300-1 is connected to the playback device 1 200-1 and the storage device 2 300-2 is connected to a playback device 2 200-2, the playback device 1 200-1 may establish a secure session with the storage device 1 300-1, and the playback device 2 200-2 may establish a secure session with the storage device 2 300-2.

In a case in which the plurality of secure sessions are established, the user may copy or move content stored in the storage device 1 300-1 to the storage device 2 300-2.

In this case, transaction information may include session identification information, so the license server 800, the retailer 500, or the playback devices 1 200-1 and 2 200-2 may identify each session identification information.

As illustrated in FIG. 9, the license server 800 may establish a first secure session with the storage device 1 300-1 through the playback device 1 200-1 and establish a second secure session with the storage device 2 300-2 through the playback device 2 200-2. Here, the first secure session and the second secure session may be identified by respective session identification information.

Also, as illustrated in FIG. 10, the retailer 500 may establish a third secure session with the storage device 1 300-1 through the playback device 1 200-1, and establish a fourth secure session with the storage device 2 300-2 through the playback device 2 200-2. Here, the third secure session and the fourth secure session may be identified by session identification information.

Through the established secure sessions, secure information such as a license key may be transmitted and received. Thus, on the basis of the license information, the playback device 1 200 or the playback device 2 200-2 may play the encrypted content files stored in the storage device 1 300-1 and the storage device 2 300-2.

FIG. 11 is an internal block diagram of a certification device managing the right to play content through communication with a playback device according to an embodiment to which the present invention is applied.

The playback device 200 to which the present invention is applied may be connected to a certification device 1000 and transmit a request message issuing a command or receive a response message from the certification device 1000. Upon receiving the response message, the playback device 200 may provide a user interface to the user or may display corresponding contents.

The certification device 1000 to which the present invention is applied may include a network interface 1010, a control unit 1020, a memory 1030, and a power supply unit 1040.

The network interface 1010 serves to allow for transmission of a command, a request message, an action, or a response message between the playback device 200 and the certification device 1000.

The control unit 1020 controls a general operation of the certification device 1000. For example, the control unit 1020 may scan or search for the presence of the playback device 200, check a status of the playback device 200, or detect a connection with the playback device 200.

Also, when a request for certification key information of a storage device is received, the control unit 1020 may check whether the certification key information is present within the certification device 1000 and transmit the certification key information to the playback device 200.

Also, when content license information request is received from the playback device 200, the control unit 1020 may check whether the content license information is present within the certification device 1000, and transmit the content license information to the playback device 200.

Also, the control unit 1020 may transmit and receive a signal in order to periodically check whether the connection between the playback device 200 and the certification device 1000 is maintained.

The memory 1030 may store at least one of certification key-related information and content license-related information of the storage device.

The power supply unit 1040 may supply power required for operations of the respective components upon receiving external power or internal power under the control of the control unit 1020.

Meanwhile, the certification device 1000 is illustrated as a separate component in FIG. 11, but it is merely illustrative and the certification device 1000 may be included in a storage device including content or any other device.

FIG. 12 is an internal block diagram of a certification device and a playback device for managing the right to play content according to an embodiment to which the present invention is applied.

The playback device 200 and the certification device 1000 to which the present invention is applied may perform a connection setup so as to be connected to a network each other, and when the playback device 200 and the certification device 1000 are connected by the network, the playback device 200 and the certification device 1000 may transmit and receive a request message and a response message, and the playback device 200 and the certification device 1000 may continuously output content by periodically checking whether the network connection is maintained.

The playback device 200 may include a storage device management unit 291, a playback device management unit 292, a secure protocol management unit 293, a certification device management unit 294, and an encryption management unit 295.

The storage device management unit 291 may serve to detect connection and separation of a storage device, and provide a secure protocol command API.

The playback device management unit 292 may perform a control command such as playing or terminating content by interworking with a content license management unit, the secure protocol management unit 293, and the certification device management unit 294.

The secure protocol management unit 293 serves to process a secure protocol such as providing a license or providing the right to play.

The certification device management unit 294 may periodically check whether a connection between the playback device 200 and the certification device 1000 is maintained, and when the connection is cut off, the certification device management unit 294 may generate an event and transmit an event message to the playback device 200. In a case in which a plurality of certification devices are present, the certification device management unit 294 may generate a list for managing the plurality of certification devices.

The encryption management unit 295 may call an API of an encryption module and perform an encryption-related function.

The certification device 1000 may include a content license management unit 1001, a license update management unit 1002, and a certification key management unit 1003.

The content license management unit 1001 may manage a list of content having the right to use, and when a request for checking the right to play is received from the playback device 200, the content license management unit 1001 may transmit a content license list.

The license update management unit 1002 may check a change in a content license and update a certification key. For example, when the user purchases new content, the license update management unit 1002 may add the new content to the content list. Also, in a case in which an expiration date of content purchased by the user expires, the license update management unit 1002 may delete the corresponding from the content list of the content license management unit 1001.

The certification key management unit 1003 may serve to store and manage a certification key required when a protocol is applied between the playback device 200 and the storage device.

FIG. 13 is a view illustrating an example of a content play process at a specific location according to an embodiment to which the present invention is applied.

Referring to FIG. 13, when secure high definition content is played at a random location, the playback time may be reduced by generating a decryption key at a location for the playback.

Specifically, in order to play the content, there should be a decryption key for decoding content, and an authentication procedure may be required for the play as necessary.

In the case of such a decryption key, one or a plurality of keys may be necessary per content, and the case that only one key is necessary is the case that the content is encrypted with one encryption key and the case that a plurality of keys are necessary is the case that the content is divided into a plurality of sections and the encryption is performed using a plurality of keys. Here, the content can be decoded only when a different decryption key is used for each section. In particular, in the case of high image quality content, the content playback may be possible only when thousands of decryption keys are used.

In such a case, a decryption key list should be made to play content, but in order to make the key list, tens of seconds to a few minutes may be needed. If a playback of the content from an arbitrary location is attempted before the completion of the decryption key list, waiting time is needed until the decryption key of the corresponding portion is generated.

Hence, in order to solve such a problem, if a playback of the content is attempted from an non-completed arbitrary part before the completion of the decryption key list, the decryption key may be set to be generated from an arbitrary part intended to be played.

As illustrated in FIG. 13, (a) if the playback device 200 starts the play of secure high definition content, the generation of the decryption key list of the content is started, and (b) as the content is played, the decryption key list is gradually generated.

(c) At this time, if the user plays the content from an arbitrary point during the play of the content, the generation of the decryption key list currently under generation is stopped and information on the arbitrary location is extracted, and if the decryption key list is not at the location where the decryption key list has not yet been generated, the decryption key list is generated from the arbitrary location.

(d) Thereafter, the decryption key list is generated from the arbitrary location and the content is generated, then the decryption key, which has not been generated by the generation of the decryption key list, is searched from the arbitrary location and generated, thereby completing the decryption key list.

FIG. 14 is a flowchart illustrating a process of playing content at a specific location according to an embodiment to which the present invention is applied.

Referring to FIG. 14, when the secure high definition content is played from the arbitrary location, the decryption key list may be generated using the information of the arbitrary location.

Specifically, after connected with the storage device 300 through the interface, the playback device 200 may obtain the encrypted content list stored in the file system of the storage device 300 and read the content of the content list (S14010).

Thereafter, when the content is played from the arbitrary location during the play of the content, the content is parsed (S14020), and the seek information indicating the arbitrary location, such as KID (media key ID), time, and byte range is extracted from the content and the seek information including the extracted information is transmitted to the storage device (S14030).

The KID is used for decrypting variant media data, and in the present invention, the KID may be used as the index for searching for the actual decryption key within the playback map.

The time may indicate time information at the arbitrary location of the content.

The storage device 300 may receive information corresponding to the arbitrary location and transmit decryption key generation information to the playback device 200 so that the decryption key may be generated from the arbitrary location (S14040).

Further, the storage device 300 may directly generate the decryption key list and transmit the generated key list to the playback device 200.

When receiving decryption key generation information transmitted from the storage device 300, the playback device 200 may play the content from the arbitrary location by generating the decryption key list based on the decryption key generation information (S14050).

When directly receiving the decryption key list from the storage device 300, the playback device 200 may play the content from the arbitrary location using the received decryption key list.

Through such a method, even when the secure high definition content is played from an arbitrary location, the playback time may be reduced than the case that the decryption key is generated from the initial location by generating the decryption key from the arbitrary location.

FIGS. 15 and 16 are an example of a flowchart and a KID list specifically illustrating a process of playing content at a specific location according to embodiments to which the present invention is applied.

Referring to FIGS. 15 and 16, when security high definition content is played from an arbitrary location, the decryption key may be generated by moving to an arbitrary location based on KID information by sharing KID list information, or the decryption key may be generated by moving to an arbitrary location based on the index information when the playback device and the storage device already know the KID list information. Hereinafter, playing the content from an arbitrary location is call "Seek".

First, step S15010 to step S15030 are the same as step S14010 and step S14020 of FIG. 14, and thus the description thereof is omitted here. FIG. 15 includes the operations added to the flowchart of FIG. 14 and thus the same description as FIG. 14 may be applied to the description of FIG. 15 even though not described again with reference to FIG. 15.

The playback device 200 may extract KID which is needed for the Seek of content, generate KID list, and transmit the generated KID list to the storage device 300 (S15040). The playback device 200 and the storage device 300 may update the KID list while generating the playback map.

Here, the playback map may include information such as the stream data block for the content playback and the decryption key corresponding thereto.

Table 1 below shows an example of a data format of the KID list and Table 2 below shows an example of KID list.

TABLE 1

| KID |
| --- |
| 128 bit Value UUID format |

TABLE 2

| KID | Whether generated (1 bit) |
| --- | --- |
| KID 1 | 1 |
| KID 2 | 1 |
| KID 3 | 0 |
| KID 4 | 1 |

In the KID list of the above Table 2, bit "1" indicates that the KID has been generated, and bit "0" indicates that the KID has not been generated.

Thereafter, the storage device 300 and the playback device 200 may start a playback provisioning for the content playback (S15050) and generate a playback map (S15060).

The playback device 200 performs Seek when there is an input of the command to execute Seek by a user's input or another method while playing the content (S15070).

The playback device 200 may extract KID related to an arbitrary location in order to execute Seek and transmit JumpToKID command indicating the movement to the location indicated by the KID to the storage device 300 (S15080).

Table 3 below indicates an example of a format of the JumpToKID command.

TABLE 3

| Operation & Parameters | Operation ID | Parameters | Total Size | Computation |
|---|---|---|---|---|
| JumpToKID | 40 | KID (128 bits) | 17 | Transmit KID value to be jumped to Storage. The Storage checks KID received as a factor, moves to the corresponding KID location at the playback map generation command set, and performs the playback generation command from the location. |

The storage device 300 may receive the JumpToKID command, prepare to generate the decryption key list form an arbitrary location, and exchange the playback map generation command including the generated decryption key list or information for generation of the decryption key list with the playback device (S15090).

The playback device 200 may generate a decryption key based on information for generation of the decryption key list obtained through the playback map generation command.

Thereafter, the storage device 300 and the playback device 200 may generate a playback map from the arbitrary location based on the playback map generation command (S15100) and the playback device 200 may decrypt the content using the decryption key at the arbitrary location and play the content (S15110).

The storage device 300 and the playback device 200 continually generate a playback map while playing the content, and if the generation of the last playback map of the content has been completed (S15120), the non-generated playback map before the arbitrary location is generated, thereby completing the generation of the playback map (S15130).

As another embodiment of the present invention, even though the storage device 300 and the playback device 200 do not share the KID list in the embodiment of FIG. 15, if information on whether there is already the list of a few KIDs is known, the step of sharing the KID list (S15040) may be omitted, and the movement to an arbitrary location may be possible with only the index information of the KID at the time of performing Seek. For example, if the playback device 200 and the storage device 300 can know the total number of KIDs from the playback map generation command set, the playback device 200 and the storage device 300 may perform Seek by exchanging only the KID index.

In this case, the storage device 300 and the playback device 200 may transmit JumToKIDIdx command in order to transmit KID index instead of the JumppTodKID command in step S15080.

Table 4 below shows an example of the format of the JumToKIDIdx.

TABLE 4

| Operation & Parameters | Operation ID | Parameters | Total Size | Computation |
|---|---|---|---|---|
| JumpToKIDIdx | 41 | KIDIdx (32 bits) | 5 | Transmit KID value to be jumped to Storage. The Storage checks KID index received as a factor, moves to the corresponding KID index location at the playback map generation command set, and performs the playback generation command from the location. |

FIG. 16 shows the KID list when the KID having not been generated before the arbitrary location is generated in step S15130. As illustrated in FIG. 16, in the state that the synchronization between the storage device 300 and the playback device 200 is maintained, if the storage device 300 and the playback device 200 plays the content until KID 2 (or KID index value is 1) and generates the KID from arbitrary location KID 2 (or KID index value is 3), KID 3 (or KID index 2) would have not been generated.

Hence, when the storage device 300 and the playback device 200 reach the end part of the playback map by generating KID after KID4 (or KID index 3), the playback map may be completed by generating the KID 3 (or KID index 2) which has not been generated in the middle by scanning whether the KID list has been generated.

FIGS. 17 and 18 illustrate a flowchart and a data format for describing a process for determining compatibility based on capability information of a storage device by a storage device according to embodiments to which the present invention is applied.

Referring to FIGS. 17 and 18, the playback device may improve the compatibility by checking capability between the playback device and the storage device by exchanging capability information of the storage device.

Specifically, the playback device 200 may transmit GetDeviceCapability Request Command requesting capability information to the storage device 300 (S17010). At this time, the playback device 200 may enable capability information of the playback device to be included in the GetDeviceCapability Request Command so as then to be transmitted.

Capability information of the playback device 200 may include version information of the standard technology (Spec.) supported by the playback device 200, backward compatibility information indicating version information of the Spec. guaranteeing the backward compatibility, etc.

In response to the request, the storage device 300 may transmit GetDeviceCapability Response Command including capability information of the storage device to the playback device 200 (S17020).

The capability information of the storage device 300 may include version information of Spec supported by the storage device 300 and backward compatibility information indicating version information of the Spec. guaranteeing the backward compatibility.

(a) of FIG. 18 shows an example of GetDeviceCapability Request Command and a common format of GetDeviceCapability Request Command, (b) indicates an example of a data format including the parameter of GetDeviceCapability Request Command, (c) indicates an example of a data format including the parameter of GetDeviceCapability Response Command, and (d) indicates the description of each parameter.

At this time, even if the Spec. versions between the playback device 200 and the storage device 300 are different, the operation scheme of the playback device 200 and the storage device 300 may be set to be different by checking the compatibility by including the backward compatibility information.

0x0701, which is OpCode of (a) of FIG. 18 shows an example and may be changed.

The playback device 200 may determine whether the storage device 300 is compatible by comparing capability information included in the GetDeviceCapability Response Command with its own capability information (S17030), and in the case of the non-compatible version, the playback device 200 may output the fact that the storage device 300 is not compatible and fails to play the content.

However, in the case of the compatible version, the playback map is generated by performing the provisioning (S17050) and the content is played (S17060).

FIG. 19 is a flowchart illustrating a process for determining compatibility based on capability information of a playback device by a playback device according to an embodiment to which the present invention is applied.

FIG. 19 describes the embodiment of FIG. 18 from the perspective of the storage device.

First, step S19010 and step S19020 are the same as step S17010 and step S17020, and thus the description thereof is omitted here. FIG. 19 includes operations added in the flowchart of FIG. 17, and the description which is the same as FIG. 17 may be applied to the description of FIG. 19 even though not described again with reference to FIG. 19.

The storage device 300 may determine whether the storage device 300 is compatible by comparing capability information included in the GetDeviceCapability Response Command with its Capability information (S19030), and in the case of the non-compatible version, the provisioning is performed (S19050) but fails (S19070).

However, in the case of the compatible version, the storage device 300 may perform the provisioning with the playback device 200 (S19050) and succeed in the provisioning so that the playback device 200 may play the content (S19060).

FIG. 20 is a flowchart illustrating a process of receiving transmission of a playable list from a retainer according to an embodiment to which the present invention is applied.

Referring to FIG. 20, a retailer 500 may play the content by transmitting the playable content list to the playback device 200 with the capability information of the playback device 200 and the storage device 300.

Specifically, the playback device 200 may transmit the capability information request message to the storage device 300 in order to request capability information to be transmitted to the retailer 500 (S20010).

The storage device 300 may transmit the capability information response message including capability information of the storage device to the playback device 200 in response to the request (S20020).

The capability information may include version information of the standard technology (Spec.) supported by the storage device.

The playback device 200 having received the capability information of the storage device 300 may transmit capability information transmission message including the capability information of the storage device 300 and the capability information of the playback device 200 to the retailer 500 (S20030).

The capability information transmission message may include profile information indicating the version information of the standard technology supported by the playback device 200, the version information of the standard technology supported by the storage device 300, and level information of the content playable by the playback device.

For example, level information of the content may indicate the content which may be played by the playback device 200 by dividing the level information of the content into SD, HD, UHD, etc.

The retailer 500 may check the version information and profile information of the standard technology of the playback device 200 and the storage device 300 included in the capability information transmission message and enable the list of contents playable in the playback device 200 to be included in the content package list transmission message so as to be transmitted to the playback device 200 (S20050).

Thereafter, the playback device may select one of the contents included in the content list transmit a message purchasing the selected content to the retailer (S2006), and the storage device 300 downloads the selected content from the retainer 500 (S20070).

The playback device 200 and the storage device 300 perform the provisioning of the downloaded content (S20080), and the playback device 200 plays the content (S20090).

Through such a method, the user may purchase a content playable in the playback device 200. Namely, the content in which the play is not possible in the playback device 200 may not be included in the content list, thereby purchasing the content without separately judging the play in the playback device 200.

FIG. 21 is a flowchart illustrating a process of playing content based on rating information having been set in a playback device according to an embodiment to which the present invention is applied.

Referring to FIG. 21, rating information having been set in the playback device may be transmitted to the storage device and the rating information of the content may be compared with the rating information of the playback device so as to determine whether to play the content.

Specifically, the playback device 200 may transmit GetDeviceCapability Request Command requesting capability information to the storage device 300 (S21010). At this time, the playback device 200 may enable capability information of the playback device to be included in the GetDeviceCapability Request Command so as to be transmitted.

The capability information of the playback device 200 may include version information of the standard technology (Spec.) supported by the playback device 200, backward compatibility information indicating the version information of the Spec. guaranteeing the backward compatibility, and rating information indicating the level of the content playable in the playback device 200 having been set in the playback device 200.

The rating information indicates the level which is divided according to the viewing rating of the content.

In response to the request, the storage device 300 may transmit GetDeviceCapability Response Command including capability information of the storage device to the playback device 200 (S21020).

The capability information of the storage device 300 may include backward compatibility information indicating version information of the Spec. supported by the storage device 300 and version information of the Spec. guaranteeing the backward compatibility.

The GetDeviceCapability Request Command and the GetDeviceCapability Response Command are the same as the format illustrated in FIG. 18. Yet, the GetDeviceCapability Request Command includes RatingInfor field including rating information in the reserved area of (a) of FIG. 18.

The storage device 300 stores rating information of the playback device 200 included in the GetDeviceCapability Request Command (S21030), and the playback device 200 starts the content and starts the play (S21040).

The playback device 200 and the storage device 300 start the provisioning for the playback of the content (S21050).

Thereafter, the storage device 300 compares the stored rating information of the playback device and rating information of the content intended to be played (S21060) and judges whether to play the content (S21070).

If the level of the rating information of the playback device is equal to or greater than the level of the rating information of the content, the provisioning succeeds (S21080) and the playback of the content succeeds (S21090).

However, if the level of the rating information of the playback device is smaller than the level of the rating information of the content, the provisioning fails (S21100), and the playback of the content succeeds (S21110).

FIG. 22 is a view illustrating an example of receiving transmission of a list of playable contents from a retailer according to an embodiment to which the present invention is applied.

FIG. 22 shows an example of a scenario of a method for receiving a transmitted playable content list described in FIG. 20.

Specifically, (a) as the playback device 200 connects to the retailer 500 in order to receive a transmitted content, the capability information of the playback device 200 and the storage device 300 explained with reference to FIG. 20 is transmitted to the retailer 500.

(b) The retailer transmits the content list playable in the playback device 200 based on the received capability information to the playback device 200.

(c) The playback device 200 selects and purchases a content list intended to be purchased and plays the purchases content.

FIG. 23 is a view illustrating an example of playing content based on rating information having been set in a playback device according to an embodiment to which the present invention is applied.

FIG. 23 shows an example of a scenario of a method of playing content using rating information having been set in the playback device described in FIG. 21.

Specifically, the storage device 300 may obtain rating information having been set in the playback device 200 through GetDeviceCapability Request Command described with reference to FIG. 21.

Thereafter, (a) if the content of the storage device 300 is selected in the playback device 200 and the play is started, (b) the playback device 200 and the storage device 300 perform provisioning, and the storage device 300 determines whether to play the content by comparing the level of the rating information of the content with the level of the rating information of the playback device 200.

(c) If the level of the rating information of the playback device is equal to or higher than the level of the rating information of the content, the content is played in the playback device 200.

However, when the level of the rating information of the playback device is smaller than the level of the rating information of the content, the content is not played for the reason that the rating levels are different.

FIG. 24 is a flowchart illustrating an example of receiving transmission of firmware from a firmware server by a storage device according to an embodiment of the present invention is applied.

Referring to FIG. 24, the firmware may be transmitted from the firmware server to the playback device or storage device by comparing the DRM (digital rights management) versions of the playback device and the storage device.

Specifically, the DRM technology is a technology for continually managing and protecting rights on the intellectual property of the digital contents using the encryption technology. Namely, this is a technology for safely transmitting various contents from a content provider (CP) to the user and preventing illegal distribution of the contents by the user. Such a DRM technology may allow information protection in the entire process of generation, distribution, use and discard of digital content, and the use and rights according to the user's authority may be protected in the off line as well as in the online.

When the DRM technology is used, secure data/key for this has been authenticated through the network communication with the license server in the state that the playback device 200 has already been preloaded, and used in the past. However, in the case of the device having not prepared DRM data, etc. in advance by hardware/software, the use of the DRM may be impossible or another setting through the network may be necessary, and the DRM technology is not applicable to the storage device itself or another setting is necessary, which have been problems. Hence, the following method is proposed in order to solve such problems.

First, after provisioning is started, the initial setup between the playback device 200 and the storage device 300 is performed, then the storage device 2020 transmits GetStorageInfo request message requesting general information of the storage device to the storage device 300 (S24020).

The storage device 300 transmits GetStorageInfo response message including general information of the storage device 300 to the playback device 200 in response to the request (S24030).

The general information included in the GetStorageInfo response message may include Manufacturer information indicating manufacturer/production company of the storage device 300, FW version information indicating the version information of the firmware, DRM version information indicating the version information of DRM, etc.

The playback device 200 compares the DRM version of the storage device 300 with the DRM version of the playback device 200 (S24040) and starts the playback when the DRM version of the storage device 300 is the same or greater (S24110).

However, when the DRM version of the storage device 300 is lower than the DRM version of the playback device 200, the playback device 200 transmits GetFWUpgradeInfo request message requesting information for the firmware upgrade of the storage device to the storage device 300 (S24040).

The storage device 300 transmits GetFWUpgradeInfo response message including information for the firmware upgrade to the playback device 200 in response to the request of the playback device 200 (S24050).

Information for the firmware upgrade may include URL (uniform resource locator) of the upgrade server which is necessary for the firmware upgrade of the storage device 300, firmware version information, chipset ID of the storage device, etc.

The playback device 200 transmits verifyFWUpgrade request message requesting the firmware upgrade to the firmware server 1100 using the URL of the upgrade server and the information of the storage device 300 (S24060).

If the firmware upgrade request is verified through the verifyFWUpgrade request message, the firmware server 1100 transmits verifyFWUpgrade response message including firmware download URL to the playback device 200 (S24080).

The playback device 200 transmits GetStorageFirmware request message requesting the firmware download to the playback device 200 or the storage device 300, to the firmware server 1100 through the firmware download URL (S24080).

Thereafter, the playback device 200 or the storage device 300 may download firmware from the firmware server 1100 (S24090), the playback device 200 transmits UpgradeFirmware request message requesting the firmware upgrade by the storage device 300 (S24100), and the storage device upgrades the firmware.

Thereafter, the playback device 200 starts the playback of the content (S24110).

FIG. 25 is a flowchart illustrating an example of importing secure data/key from a storage device by a playback device according to an embodiment to which the present invention is applied.

Referring to FIG. 25, the playback device may import secure data/key for the content playback through the secure session from the storage device.

First, step S25010 to step S25030 are the same as step S24010 to step S24030, and thus the description thereof is omitted here.

Thereafter, it is determined whether the playback device 200 may perform the DRM import function (S25040), and if the playback device 200 can perform the importing function, the playback device 200 and the storage device 300 generate the secure session for the import function (S25050).

The playback device 200 imports secure data/key existing in the secure memory of the storage device through the generated secure session, thereby bringing the secure data/key to the secure memory of the playback device 200 (S25060).

The storage device 300 has the secure memory as the playback device 20, and the secure memory of the storage device 300 includes the key set used in the storage device 300 and the key set used in the playback device 200.

The key set may include Rivest Shamir Adleman (RSA) public key, Advanced Encryption Standard (AES) base key, and RSA private key.

When the import is completed, the playback device 200 transmits Complete import notification message to the storage device 300, thereby notifying the completion of the import to the storage device 300 (S25070).

At this time, when the corresponding key, etc. is individual or has a limit in the number, the corresponding data may be deleted or an available number may be reduced.

Thereafter, when there is a remaining provisioning procedure, a progress to a new secure session is possible.

However, when the playback device 200 cannot perform the import function, it is outputted that the import function is not supportable (S25080).

FIG. 26 is a flowchart illustrating an example of receiving transmission of secure data/key from a key issuance sever by a storage device according to an embodiment to which the present invention is applied.

Referring to FIG. 26, if there is no secure data/key in the storage device while the playback device imports secure data/key from the storage device, the secure data/key is downloaded from the key distribution server 1200 so as to be imported to the playback device.

First, step S26010 to step S26050 are the same as step S25010 to S25050 of FIG. 25, and the description thereof is omitted here.

The storage device 300 determines whether there is a secure data/key in the storage device (S26060), and if there is not the secure data/key, the secure data/key is downloaded from the key distribution server 1200 (S26070).

Hereinafter, step S26080 to step S26100 are the same as step S25060 to step S25080 of FIG. 25, and thus the description thereof will be omitted here.

FIG. 27 is s view illustrating an example of importing or downloading secure data/key by a playback device according to an embodiment to which the present invention is applied.

FIG. 27 shows an example of a scenario of a method of importing secure data/key from the storage device described with reference to FIGS. 25 and 26.

Specifically, (a) if the secure-DRM-applied storage device 300 is connected to the playback device 200, (b) the playback device may import secure data/key for the playback of the content from the storage device. At this time, if there is no secure data/key or all secure data/keys have been consumed up in the storage device, the storage device 300 may download the secure data/key from the key distribution server 1000, and after the downloading, the playback device 200 may import secure data/key from the storage device 300.

(c) Thereafter, the playback device plays the content using the imported secure data/key.

FIG. 28 is a view illustrating an example of downloading firmware from a firmware server according to an embodiment to which the present invention is applied.

FIG. 28 shows an example of a scenario of a method of upgrading firmware of the storage device from the firmware server when the firmware version of the storage device described with reference to FIG. 24 is lower than the firmware version of the playback device.

Specifically, as described with reference to FIG. 24, (a) the playback 200 may compare the firmware version of the storage device 300 with the firmware version of the playback device.

When the firmware version of the storage device is equal to or greater than the firmware version of the playback device 200, the playback device 200 may play the content.

(b) However, if the firmware version of the storage device 300 is lower than the firmware version of the playback device 200, the playback device cannot play the content for the reason that the DRM version is not fitting or can upgrade the firmware of the storage device from the firmware server 1100.

(c) When the firmware upgrade from the firmware server 1100 is not possible, the content cannot be played, but when upgraded, the playback device 200 can play the content to which the DRM of the corresponding version has been applied.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

The invention claimed is:

1. A method for managing license information for playback content by a playback device, the method comprising:
 receiving a certificate revision list (CRL) from a license server;
 receiving encrypted license information allowing the content to be played through a first session established between a storage device and the license server;
 transmitting transaction information to the license server, wherein the transaction information includes transaction identification information used for identifying a corresponding transaction and user, wherein the content includes contents corresponding to multiple versions, and the multiple versions represent an image quality, wherein each of the contents corresponding to the multiple versions corresponds to right information, and the right information allows the storage device to obtain the encrypted license information, and wherein the first session is identified by session identification information;

receiving a playback signal indicating playback of a specific position of the content;

obtaining search information indicating the specific position from the content;

transmitting the obtained search information to the storage device;

receiving generation information for generating a decryption key list the decryption key list generated based on the search information from the storage device, wherein the decryption key list is generated at the specific position of the content when the content is played at the specific position; and playing the content at the specific position based on a decryption key included in the decryption key list and the encrypted license information.

2. The method of claim I, further comprising:

receiving the content from an external sever through a second session established between the storage device and the external server, wherein the session identification information indicates one of at least of two types of session statuses, wherein the at least two types of session statuses include a secure session and a non secure session, wherein the first session indicates the secure session, wherein the second session indicates the non secure session, wherein first session identification information indicating the secure session is represented as 0x001, and wherein second session identification information indicating the non secure session is represented as 0x000.

3. The method of claim 1, wherein the search information includes at least one of media key ID (KID) information indicating information related to the decryption key, time intbrmation indicating a playback time at the specific position or byte range information indicating a size of the content at the specific position.

4. The method of claim 3, wherein the media key ID information includes a media key ID indicating the specific position or index information of the media key ID.

5. The method of claim 4, further comprising:

transmitting list information of the media key ID included in the content.

6. A playback device for managing license information for content playback, the playback device comprising:

a display unit configured to output a content; and a control unit functionally connected to the display unit, wherein the control unit is configured to:

receive a certificate revision list (CRL) from a license server, receive encrypted license information allowing the content to be played through a first session established between a storage device and the license server, transmit transaction information to the license server, wherein the transaction information includes transaction identification information used for identifying a corresponding transaction and user, wherein the content includes contents corresponding to multiple versions, and the multiple versions represent an image quality, and wherein each of the contents corresponding to the multiple versions corresponds to right information, and the right information allows the storage device to obtain the encrypted license information, receive a playback signal indicating playback of a specific position of the content, obtain search information indicating the specific position from the content, transmit the obtained search information to the storage device, receive generation information for generating a decryption key list or the decryption key list generated based on the search information from the storage device, wherein the decryption key list is generated at the specific position of the content, and play the content at the specific position based on a decryption key included in the decryption key list based on the encrypted license information, wherein the first session is identified by session identification information.

7. The playback device of claim 6, wherein the control unit is further configured to:

receive the content, from an external sever, through a second session established between the storage device and the external server, wherein the session identification information indicates one of at least of two types of session statuses, wherein the at least two types of session statuses include a secure session and a non secure session, wherein the first session indicates the secure session, wherein the second session indicates the non secure session, wherein first session identification information indicating the secure session is represented as 0x001, and wherein second session identification information indicating the non secure session is represented as 0x000.

8. The playback device of claim 7, wherein the search information includes at least one of media key ID (KID) information indicating information related to the decryption key, time information indicating a playback time at the specific position or byte range information indicating a size of the content at the specific position.

9. The playback device of claim 8, wherein the media key ID information includes a media key ID indicating the specific position or index information of the media key ID.

10. The playback device of claim 9, wherein the control unit is further configured to:

transmit list information of the media key ID included in the content.

* * * * *